(12) United States Patent
Liu et al.

(10) Patent No.: US 8,839,372 B2
(45) Date of Patent: *Sep. 16, 2014

(54) STATION-TO-STATION SECURITY ASSOCIATIONS IN PERSONAL BASIC SERVICE SETS

(75) Inventors: Yong Liu, Campbell, CA (US); Paul A. Lambert, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 635 days.

This patent is subject to a terminal disclaimer.

(21) Appl. No.: 12/966,324

(22) Filed: Dec. 13, 2010

(65) Prior Publication Data

US 2011/0154039 A1 Jun. 23, 2011

Related U.S. Application Data

(60) Provisional application No. 61/289,888, filed on Dec. 23, 2009.

(51) Int. Cl.
*H04L 29/06* (2006.01)
(52) U.S. Cl.
CPC .......... *H04L 63/061* (2013.01); *H04L 63/0869* (2013.01)
USPC .............................................. 726/4; 380/277
(58) Field of Classification Search
None
See application file for complete search history.

(56) References Cited

U.S. PATENT DOCUMENTS

| 7,477,746 | B2 | 1/2009 | Kang et al. | |
|---|---|---|---|---|
| 7,995,546 | B2 * | 8/2011 | Walker et al. | 370/338 |
| 8,036,176 | B2 | 10/2011 | Oba et al. | |
| 2004/0085945 | A1 | 5/2004 | Takabatake et al. | |
| 2006/0083200 | A1 | 4/2006 | Emeott et al. | |
| 2007/0067164 | A1 | 3/2007 | Goudar | |
| 2007/0081673 | A1 | 4/2007 | Ren | |
| 2007/0097934 | A1 | 5/2007 | Walker et al. | |
| 2007/0099669 | A1 | 5/2007 | Sadri et al. | |
| 2007/0121947 | A1 | 5/2007 | Sood et al. | |
| 2007/0160017 | A1 | 7/2007 | Meier et al. | |
| 2007/0192832 | A1 | 8/2007 | Qi et al. | |
| 2008/0003556 | A1 | 1/2008 | Takahashi et al. | |
| 2008/0016350 | A1 | 1/2008 | Braskich et al. | |
| 2008/0040777 | A1 | 2/2008 | Aihara et al. | |
| 2008/0273696 | A1 | 11/2008 | Greco et al. | |
| 2008/0294897 | A1 | 11/2008 | Patwardhan et al. | |
| 2008/0298328 | A1 | 12/2008 | Sharma | |

(Continued)

FOREIGN PATENT DOCUMENTS

EP      1515510 A2    3/2005
JP   2000286866 A    10/2000

(Continued)

OTHER PUBLICATIONS

International Search Report and Written Opinion dated Apr. 13, 2011, in related PCT matter No. PCT/US2010/061746.

(Continued)

*Primary Examiner* — Pramila Parthasarathy

(57) ABSTRACT

A personal basic service set (PBSS) includes a first device configured to communicate in the PBSS and a second device configured to communicate in the PBSS. The first device is configured to establish a robust security network association (RSNA) with the second device (i) without associating with a PBSS control point (PCP) and (ii) without associating with the second device.

18 Claims, 15 Drawing Sheets

(56) References Cited

U.S. PATENT DOCUMENTS

| | | | |
|---|---|---|---|
| 2009/0019539 A1* | 1/2009 | Jonnalagadda et al. | 726/14 |
| 2009/0073945 A1 | 3/2009 | Seok | |
| 2009/0241007 A1 | 9/2009 | Hong et al. | |
| 2009/0262937 A1 | 10/2009 | Hirth et al. | |
| 2010/0208896 A1 | 8/2010 | Goto | |
| 2010/0284393 A1 | 11/2010 | Abraham et al. | |
| 2010/0333185 A1* | 12/2010 | Lambert et al. | 726/6 |
| 2011/0075642 A1* | 3/2011 | Cordeiro et al. | 370/338 |

FOREIGN PATENT DOCUMENTS

| | | |
|---|---|---|
| JP | 2009141588 A | 6/2009 |
| JP | 2010530159 A | 9/2010 |
| WO | WO2007/066959 | 6/2007 |
| WO | WO2007/111710 | 10/2007 |
| WO | WO2008/019942 | 2/2008 |
| WO | WO2008/112455 | 9/2008 |
| WO | WO-2008153164 A2 | 12/2008 |
| WO | WO-2009008593 A1 | 1/2009 |
| WO | WO-2009114631 A1 | 9/2009 |

OTHER PUBLICATIONS

Ohyoung Song et al.: Hardware-software co-design of secure WLAN system for high throughput; Wireless Days (WD), 2009 $2^{nd}$ IFIP, IEEE, Piscataway, NJ, Dec. 15, 2009; pp. 1-5.

The Notification Concerning Transmittal of International Preliinary Report on Patentability (Chapter I of the Patent Cooperation Treaty) and Written Opinion of the International Searching Authority issued Jan. 12, 2012, in corresponding International Application No. PCT/US2010/039641; 7 pages.

David A. McGrew and John Viega, "The Security and Performance of the Galois/Counter Mode (GCM) of Operation"; Oct. 7, 2004; 21 pages.

Housley et al., "GigaBeam High-Speed Radio Link Encryption; RFC 4705"; Oct. 2006.

International Search Report for cooresponding International application No. PCT/US2010/046595; mailed Feb. 16, 2011.

International Search Report for International Application No. PCT/US2010/039641, dated Jan. 24, 2011.

Morris Dworkin, "Recommendation for Block Cipher Modes of Operation: Galois/Counter Mode (GCM) and GMAC", NIST Special Publication 800-380, Nov. 2007; 39 pages.

Patent Cooperation Treaty (PCT) International Search Report and Written Opinion, from co-pending PCT International Application No. PCT/US201 0/037706, International Filing Date Jun. 8, 2010 having a date of mailing of Jan. 25, D 2011 (12 pgs).

IEEE Std 802.11-2007 (Revision of IEEE Std 802.11-1999); IEEE Standard for Information technology—Telecommunications and information exchange between systems—Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Jun. 12, 2007; 1232 pages.

Information technology—Telecommunications and information exchange between systems—Local and metropolitan area networks—Specific requirements—Part 11: Wireless LAN Medium Access Control (MAC) and Physical Layer (PHY) specifications, ANSI/IEEE Std 802.11, 1999, Institute of Electrical and Electronics Engineers, Inc., New York, NY, USA.

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band, ANSI/IEEE Std 802.11a, 1999, Institute of Electrical and Electronics Engineers, Inc., New York, NY, USA.

Information technology—Telecommunications and information exchange between systems—Local and metropolitan area networks—Specific requirements—Part 11: Wireless LAN Medium Access Control (MAC) and Physical Layer (PHY) specifications: Amendment 6: Medium Access Control (MAC) Security Enhancements, ANSI/IEEE Std 802.11i, 2004, Institute of Electrical and Electronics Engineers, Inc., New York, NY, USA.

Winget, TGI Draft Comments 5.0, Aug. 2003, IEEE 802.11-3/657r0.

U.S. Appl. No. 61/257,405, filed Nov. 2009, Liu et al.

U.S. Appl. No. 61/259,091, filed Nov. 2009, Liu et al.

U.S. Appl. No. 61/259,919, filed Nov. 2009, Liu et al.

Japanese Notice of Reasons for Rejection dated Mar. 11, 2014 for Japanese Application No. 2012-517682; 2 Pages.

Japanese Office Action dated Mar. 18, 2014 for Japanese Application No. 2012-546188; 2 Pages.

* cited by examiner

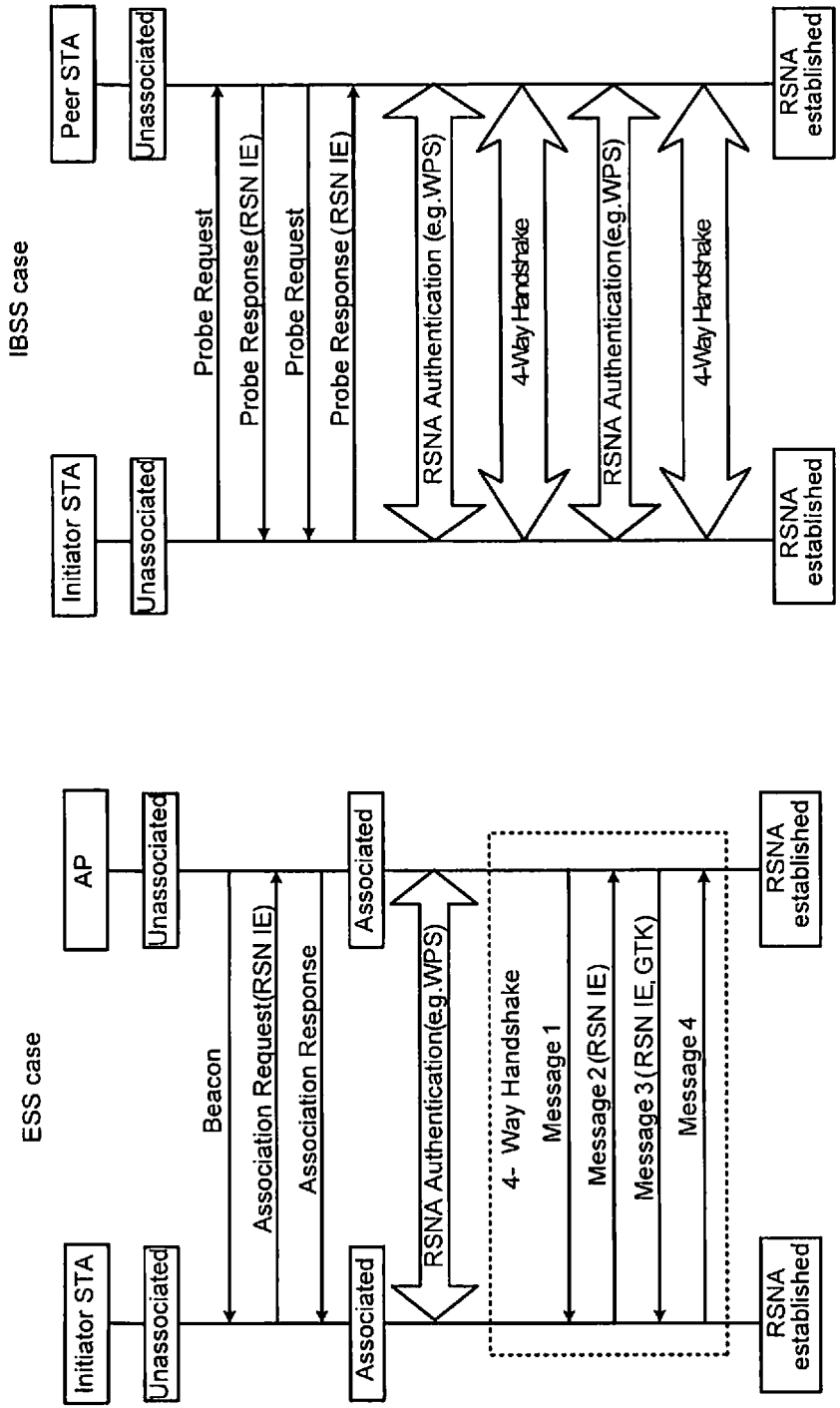

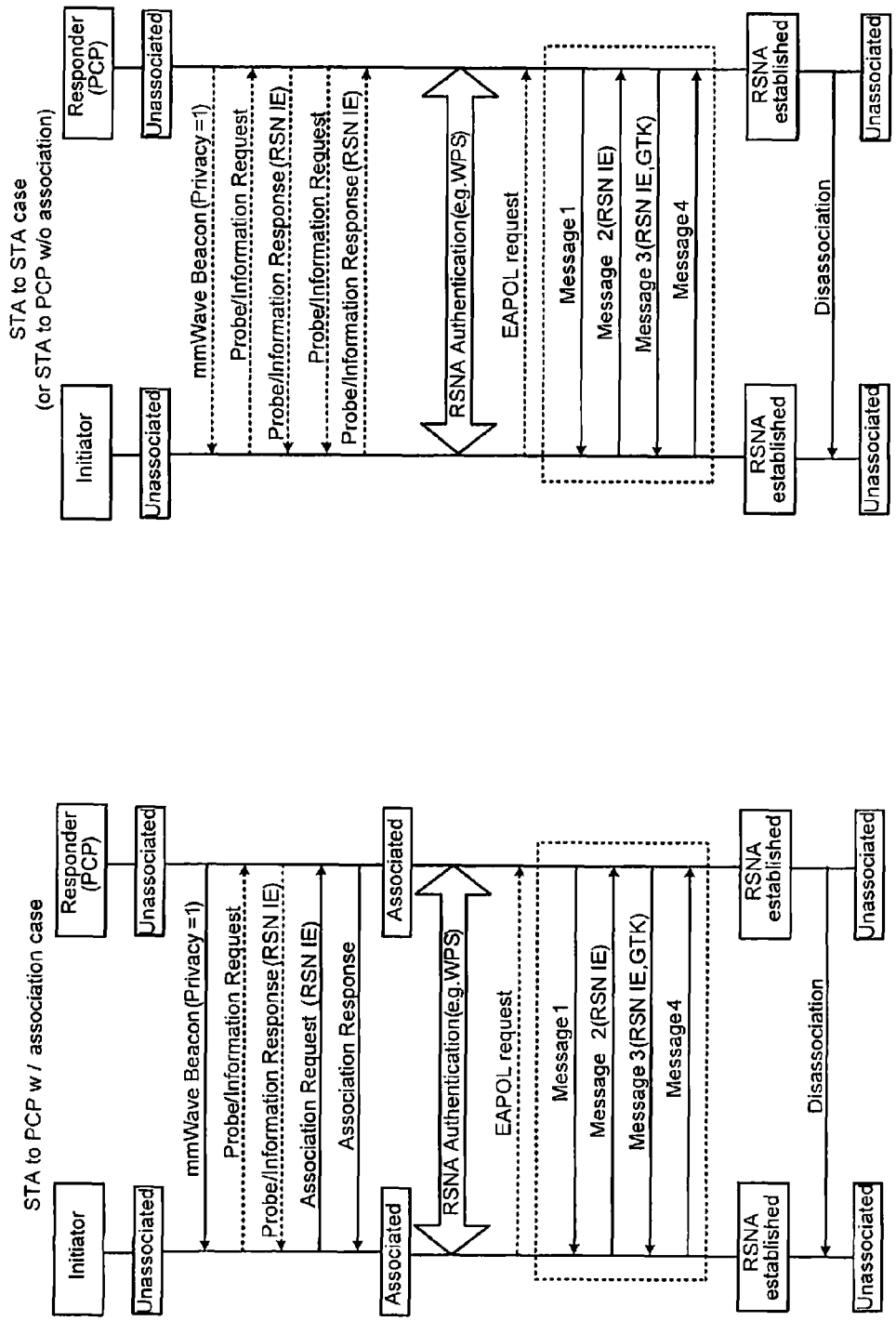

US 8,839,372 B2

STATION-TO-STATION SECURITY ASSOCIATIONS IN PERSONAL BASIC SERVICE SETS

CROSS-REFERENCE TO RELATED APPLICATIONS

This application claims the benefit of U.S. Provisional Application No. 61/289,888, filed on Dec. 23, 2009.

This application is related to U.S. patent application Ser. No. 12/784,050 filed May 20, 2010 and U.S. patent application Ser. No. 12/795,994 filed Jun. 8, 2010.

The disclosures of the above applications are incorporated herein by reference in their entirety.

FIELD

The present disclosure relates generally to wireless communications, and more particularly to establishing station-to-station security associations in personal basic service sets.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The Institute of Electrical and Electronics Engineers (IEEE) and the Wireless Gigabit Alliance (WGA) have developed several specifications and standards that define security protocols to be followed by wireless communication devices. Wireless communication devices can exchange data securely when the security protocols are used to authenticate communications between the wireless communication devices.

SUMMARY

A personal basic service set (PBSS) includes a first device configured to communicate in the PBSS and a second device configured to communicate in the PBSS. The first device is configured to establish a robust security network association (RSNA) with the second device (i) without associating with a PBSS control point (PCP) and (ii) without associating with the second device.

In other features, the first device includes a first station of the PBSS, and the second device includes a second station of the PBSS or the PCP.

In other features, the first device and the second device are further configured to exchange security capabilities of each other using messages other than association frames, selectively perform a single authentication procedure, and perform a single 4-way handshake.

In other features, the first device has a first medium access control (MAC) address, and the second device has a second MAC address. In response to the first device and the second device attempting to establish the RSNA at the same time, the first device is further configured to continue establishing the RSNA, and the second device is further configured to discontinue establishing the RSNA in response to the first MAC address being lower than the second MAC address; or the second device is further configured to continue establishing the RSNA, and the first device is further configured to discontinue establishing the RSNA in response to the second MAC address being lower than the first MAC address.

In other features, the first device and the second device are further configured to establish the RSNA using a common master key. The common master key is (i) a pre-shared key input into the first device and the second device or (ii) assigned by a PBSS authenticator. The PBSS authenticator includes the PBSS control point (PCP), a station or a group of stations of the PBSS authorized as the PBSS authenticator, or a station of the PBSS configured to install the common master key.

In other features, the first device and the second device are further configured to (i) skip mutual authentication and (ii) conduct a 4-way handshake to establish the RSNA in response to determining that a same master key is installed in the first device and the second device.

In other features, at least one of the first device and the second device is further configured to include a key identifier in an advertisement message. The key identifier (i) indicates that a common master key is installed in the respective device and (ii) is generated based on the common master key and a network identifier of the PBSS.

In other features, the first device is further configured to determine, based on an advertisement message received from the second device, whether a common master key is installed in the first device and the second device. In response to determining that the common master is installed in the first device and the second device, the first device is further configured to (i) skip mutual authentication and (ii) conduct a 4-way handshake with the second device to establish the RSNA.

In other features, the first device and the second device are further configured to exchange messages other than a 4-way handshake to perform the following at the same time: (i) exchange security capabilities of each other, (ii) associate with each other, and (iii) establish the RSNA.

In other features, the first device and the second device are further configured to tunnel at least one of the messages through the PBSS control point (PCP).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 3A depicts a robust security network association (RSNA) setup between a station (STA) and an access point (AP);

FIG. 3B depicts a RSNA setup between two stations in an ad-hoc network;

FIG. 3C depicts a RSNA setup between a station and a PBSS control point (PCP) in a PBSS;

FIG. 3D depicts a RSNA setup between an initiator and a responder in a PBSS;

DESCRIPTION

Figure 1B:
FIG. 1B depicts an ad-hoc network.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In a personal basic service set (PBSS) compliant with standards developed by the Wireless Gigabit Alliance (WGA), a PBSS control point (PCP) typically serves as an authenticator. Accordingly, a station joining the PBSS first forms a security association with the PCP. The station obtains a master key from the PCP, derives a temporal key using the master key, and then securely exchanges data (encrypted using the temporal key) with the PCP or other stations in the PBSS. Thus, stations typically cannot directly form security associations with each other without first forming security associations with the PCP.

The present disclosure relates to establishing a robust security network association (RSNA) between two stations in a PBSS, where one station initially obtains a master key from an authenticator in the PBSS, becomes an authenticator, and can subsequently authenticate any member joining the PBSS. The authenticator can be a PCP or a station that has become an authenticator as described below in detail. Thus, stations in a PBSS can form security associations with each other without first associating with the PCP.

The present disclosure is organized as follows. Different types of networks and different methods normally used to establish RSNA in the networks are described with reference to FIGS. 1A-3D. Different methods for obtaining an RSN information element (RSN IE) in a PBSS are described with reference to FIGS. 4A-4E. Different approaches of authentication used in a PBSS are described with reference to FIGS. 5A-5D. Different methods for establishing RSNA between two stations according to the present disclosure are described with reference to FIGS. 6A-8B. An example of a wireless device capable of implementing the different methods for obtaining RSN IE, the different approaches of authentication, and the different methods for establishing RSNA is described with reference to FIG. 9.

Figure 1A:
FIG. 1A depicts an infrastructure network.
Figure 1C:
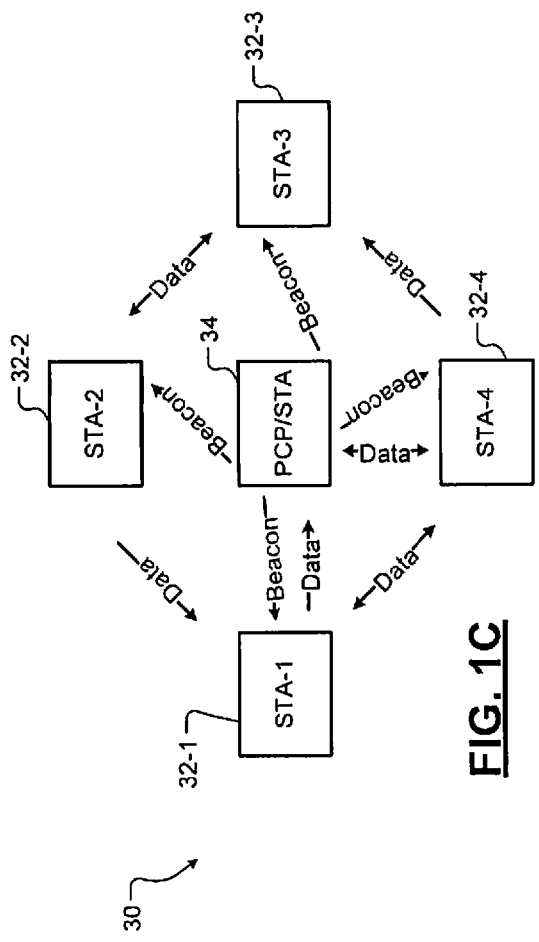
FIG. 1C depicts a personal basic service set (PBSS)

FIGS. 1A-1C illustrate different types of wireless networks. In one implementation, the networks shown in FIGS. 1A and 1B comply with one or more 802.1x standards developed by the Institute of Electrical and Electronics Engineers (IEEE). In one implementation, the network shown in FIG. 1C complies with standards developed by the Wireless Gigabit Alliance (WGA).

In FIG. 1A, an infrastructure network 10 includes an access point (AP) 12 and a plurality of client stations STA-1 14-1, . . . , and STA-n 14-n (collectively STAs 14). The AP 12 and the STAs 14 form a basic service set (BSS) having a BSS identifier (BSSID). The AP 12 transmits beacons to the STAs 14, where each beacon includes the BSSID. Each STA 14 communicates with the AP 12 using the BSSID. A plurality of interconnected BSSs is called an extended service set (ESS).

In FIG. 1B, an ad-hoc network 20 includes, for example, three client stations STA-1 22-1, STA-2 22-2, and STA-3 22-3 (collectively STAs 22). Although only three STAs 22 are shown, the ad-hoc network 20 can include more or less than three STAs 22. The STAs 22 form an independent BSS (IBSS) having a BSSID. Each STA 22 can communicate with any of the other STAs 22 without an AP. Each STA 22 listens for a beacon and can transmit a beacon if none of the other STAs 22 transmits a beacon. The beacon includes the BSSID.

In FIG. 1C, a personal BSS (PBSS) 30 includes, for example, four client stations STA-1 32-1, STA-2 32-2, STA-3 32-3, and STA-4 32-4 (collectively STAs 32), and a PBSS control point (PCP) 34. Although only four STAs 32 are shown, the PBSS 30 can include more or less than four STAs 32. The STAs 32 and the PCP 34 communicate in a 60 GHz band. The PBSS 30 is self-contained since the PCP 34 does not connect to an external distribution system (e.g., the Internet). In the PBSS 30, only the PCP 34 sends beacons. The STAs 32 do not send beacons. The STAs 32 may or may not associate with PCP 34. STA-to-STA (S2S) communication without connecting to the PCP 34 is common in the PBSS 30. Further, a data link setup (DLS) or a tunneled DLS (TDLS) may not be needed for STA-to-STA communication in the PBSS 30. One of the STAs 32 may send broadcast/multicast frames directly to other STAs 32 without using the PCP 34.

Two network devices can exchange data securely by establishing a robust security network association (RSNA) between the two network devices. RSNA is a general term used to describe a security relationship between two network devices and typically includes authentication and security association between the two network devices. Authentication usually leads to creation of a master key. Security association usually includes a 4-Way Handshake and leads to creation of a temporal key.

Establishing RSNA between two network devices typically includes the following steps: (1) RSNA capabilities and policies advertisement or inquiry; (2) association; (3) RSNA authentication resulting in pairwise master key security association (PMKSA) setup (i.e., creating PMK); and (4) a 4-Way handshake resulting in pairwise transient key security association (PTKSA) setup (i.e., creating PTK). After RSNA is established between two network devices, the two network devices exchange data encrypted using the PTK.

The term pairwise refers to two network devices that want to communicate with each other and refers to a type of encryption key hierarchy pertaining to keys shared by only two network devices. Generally, in an authentication process, a supplicant is an entity (e.g., a network device) at one end of a point-to-point local area network (LAN) segment that is being authenticated by an authenticator attached to the other end of the LAN segment. The supplicant and the authenticator can be the two entities (e.g., network devices) referenced by the term pairwise.

Figure 2B:
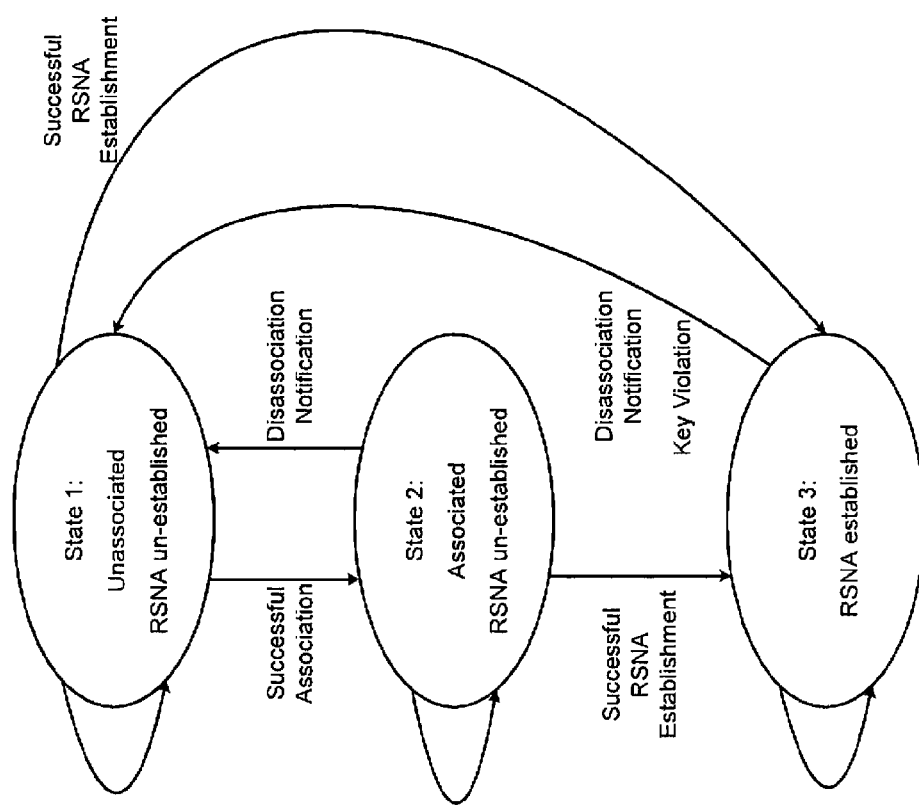
FIG. 2B is a state-diagram of a station in a PBSS.
Figure 2A:
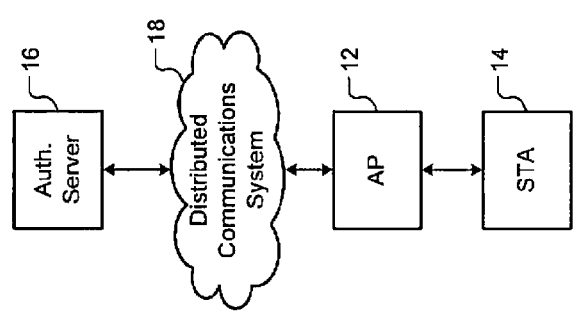
FIG. 2A depicts authentication in an infrastructure network.

Referring now to FIGS. 2A and 2B, differences in establishing secured connections in BSS/ESS and PBSS are shown. In FIG. 2A, in the infrastructure network 10, when the STA 14 wants to associate with the AP 12, the AP sends authentication information of the STA 14 to an authentication server 16 via a distributed system 18 (e.g., the Internet). Based on the authentication information, the authentication server 16 determines whether the STA 14 can associate with the AP 12. The STA 14 associates with the AP 12 if the authentication server 16 determines that the STA 14 can associate with the AP 12.

In contrast, in the PBSS 30, the STA 32 can establish a robust security network association (RSNA) with the PCP 34 with or without associating with the PCP 34. Additionally, one STA 32 can establish RSNA with another STA 32 without associating with the other STA 32 or the PCP 34. As used herein, the term association refers to exchanging information related to basic communication parameters (e.g., data rates) via association frames.

In FIG. 2B, the STA 32 can have different states. In State 1, the STA 32 is unassociated, and RSNA is un-established. In State 2, the STA 32 is associated but RSNA is un-established. In State 3, the STA 32 is associated or unassociated, but RSNA is established. The STA 32 can transition from State 1 to State 3 and vice versa without transitioning to State 2. That is, the STA 32 can establish RSNA with another STA 32 or the PCP 34 with or without association. Further, the STA 32 need not associate with the PCP 34 in order to communicate with another STA 32 or the PCP 34.

Referring now to FIGS. 3A-3D, RSNA setup in different networks is shown in detail. In FIG. 3A, RSNA setup between a STA and an AP (e.g., in a BSS/ESS) is shown, where a STA (e.g., STA 14) is an initiator since the STA initiates RSNA with the AP (e.g., the AP 12). Initially, both the STA and the AP are unassociated with each other. The STA receives a beacon from the AP. The STA sends an association request to the AP. The association request includes an information element (IE) called RSN IE, which includes authentication information of the STA. The AP verifies the authentication information and sends an association response to the STA. At this point, the STA and the AP are associated with each other.

The association is followed by RSNA authentication and a 4-way handshake between the STA and the AP. In RSNA authentication, the STA obtains a master key from the AP. The 4-way handshake is conducted to negotiate a pairwise cipher suite to be used to encrypt data and to establish a pairwise transient key security association (PTKSA) and a group temporal key security association (GTKSA). A typical 4-way handshake is described below.

In a first message (Message 1), the AP supplies an authenticator Nonce (ANonce) to the STA. In a second message (Message 2), the STA provides a supplicant Nonce (SNonce), a message integrity code (MIC), and a RSN IE to the AP. The RSN IE indicates a pairwise cipher suite selected by the STA. In a third message (Message 3), the AP supplies an ANonce, a MIC, and a RSN IE. The RSN IE indicates a pairwise cipher suite selected by the AP. Additionally, the third message includes a group temporal key (GTK) generated by the AP. A fourth message (Message 4) includes the MIC supplied by the STA to the AP. Based on the information exchanged in the 4-way handshake, the STA and the AP generate a pairwise transient key (PTK) and the group temporal key (GTK). At this point, RSNA is established between the STA and the AP. The STA and the AP use the PTK and the GTK to encrypt data exchanged by the STA and the AP.

In FIG. 3B, RSNA setup between two STAs (e.g., STAs 22) communicating in an ad-hoc network is shown, where one STA is the initiator that initiates RSNA with a peer STA. Initially, both the STAs are unassociated with each other. The initiator STA sends a probe request to the peer STA. The peer STA sends a probe response to the initiator STA, which includes a RSN IE of the peer STA. Additionally, the peer STA sends a probe request to the initiator STA. The initiator STA sends a probe response to the peer STA, which includes a RSN IE of the initiator STA. Subsequently, the two STAs perform RSNA authentications and 4-way handshakes as shown to generate PTK and establish RSNA between the two STAs. Note that two RSNA authentications and two 4-Way Handshakes are performed between the peer STAs since either STA has to serve as both an initiator and a responder. The two STAs use the PTK to encrypt data exchanged between the two STAs.

In FIG. 3C, RSNA setup between a STA and a PCP in a PBSS is shown, where the STA is the initiator, the PCP is a responder, and the RSNA setup includes formation of association between the STA and the PCP. Initially, both the STA and the PCP are unassociated with each other. The STA receives a beacon (mmWave beacon) from the PCP. The STA sends a probe/information request to the PCP. The PCP sends a probe/information response to the STS, which includes an RSN IE of the PCP. The STA sends an association request to the PCP, which includes an RSN IE of the STA. The PCP verifies the security capability information of the STA and sends an association response to the STA. At this point, the STA and the PCP are associated with each other.

The association is followed by RSNA authentication, transmission of an EAPOL request from the STA to the PCP to trigger security association, and a 4-way handshake between the STA and the AP, where EAPOL denotes extensible authentication protocol over local area networks. The 4-way handshake is conducted to negotiate a pairwise cipher suite to be used to encrypt data and to establish a pairwise transient key security association (PTKSA) and a group temporal key security association (GTKSA). Based on the information exchanged in the 4-way handshake, the STA and the PCP generate the pairwise transient key (PTK) and the group temporal key (GTK). At this point, RSNA is established between the STA and the PCP. The STA and the PCP use the PTK and the GTK to encrypt data exchanged by the STA and the PCP.

In FIG. 3D, RSNA setup between an initiator and a responder in a PBSS is shown. Each of the initiator and the responder can be a STA. Alternatively, the initiator can be a STA, and the responder can be a PCP. The RSNA setup does not include forming an association between the initiator and the responder. Initially, both the initiator and the responder are unassociated with each other. When both the initiator and the responder are STAs, both STAs send a probe request to each other to obtain RSN IEs as shown. Different from the IBSS case shown in FIG. 3B, the RSNA authentication and 4-way handshake are conducted only once between the two STAs. If both the STAs attempt to establish RSNA at the same time (i.e., if a race condition occurs), the STA having a higher MAC address terminates the RSNA, the STA having a lower MAC address continues the RSNA to generate PTK and GTK, and RSNA is established between the two STAs. The two STAs use the PTK and the GTK to encrypt data exchanged between the two STAs.

In BSS/ESS and in PBSS with association cases, a STA obtains a RSN IE (i.e., security capabilities and policies) of the AP/PCP via beacons or probe responses received from the AP/PCP, and the AP/PCP obtains a RSN IE of the STA via association requests received from the STA. In a PBSS, however, a STA need not associate with a PCP. In PBSS without association cases, a peer STA may obtain RSN IE of an initiator STA using different options. For example, the peer STA may probe the initiator STA for RSN IE, the initiator STA may advertise the RSN IE in probe requests, or the RSN IE may be communicated via one of the 4-way handshake messages. Each option is described below in detail.

Figures 4A, 4B:
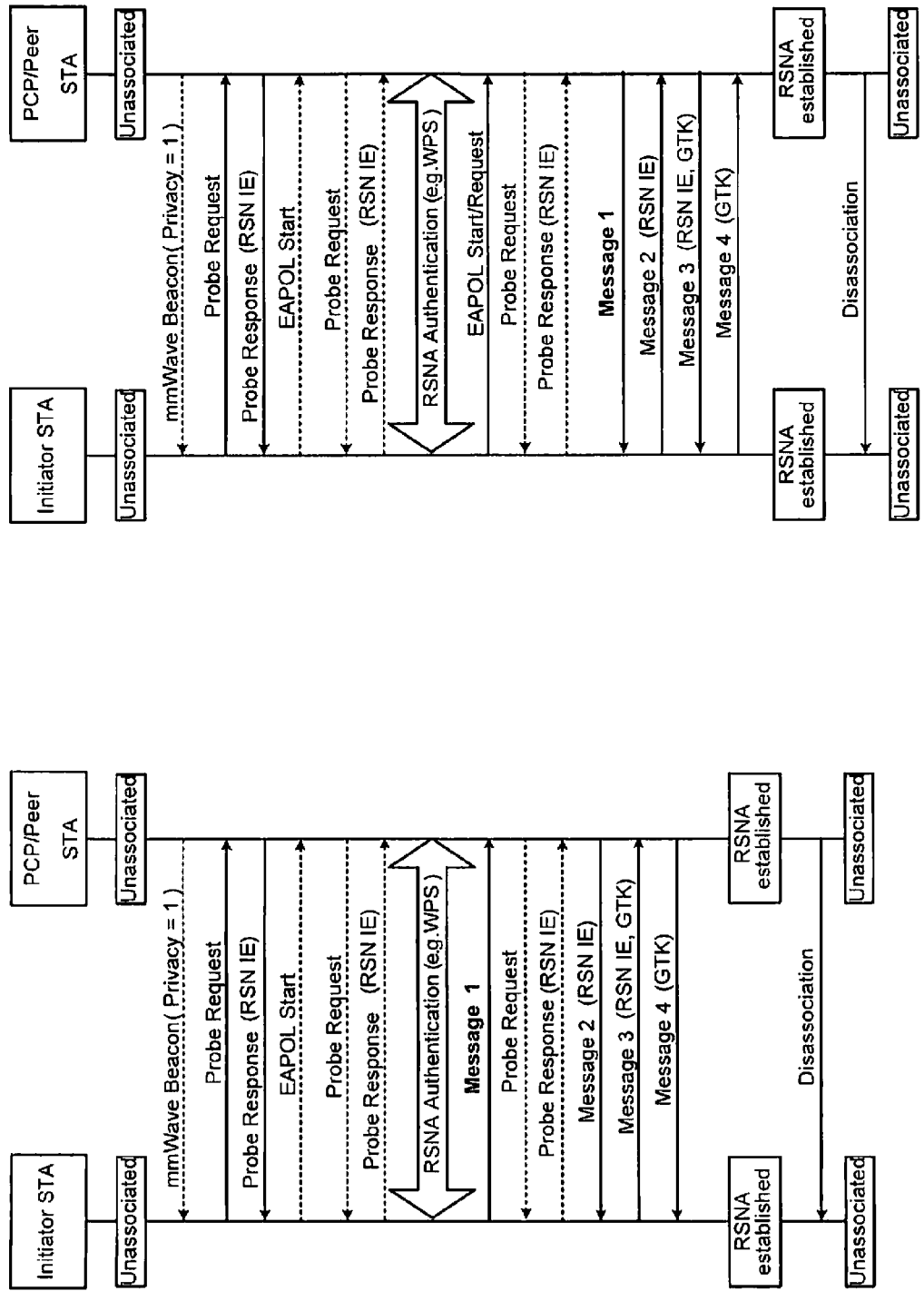
FIGS. 4A-4D depict different methods for exchanging a robust security network information element (RSN IE)

Referring now to FIG. 4A, a peer STA may probe an initiator STA for the RSN IE. On receiving a RSNA authentication triggering message or Message 1 of the 4-Way Handshake, the peer STA may send a Probe Request to the initiator STA to obtain the security capability of the initiator STA. Based on the security capability of the initiator STA, the peer STA includes the security suite selection of the peer STA in an RSN IE of the peer STA in Message 2 of the 4-Way Handshake.

Referring now to FIG. 4B, alternatively, on receiving a RSNA authentication triggering message or a 4-Way handshake triggering message, the peer STA may send a Probe Request to the initiator STA to obtain the security capability of the initiator STA. Based on the security capability of the initiator STA, the peer STA starts 4-Way handshake by sending Message 1. Note that while the initiator STA starts Message 1 of the 4-way handshake in FIG. 4A, the peer STA starts Message 1 of the 4-way handshake in FIG. 4B.

Figure 4D:
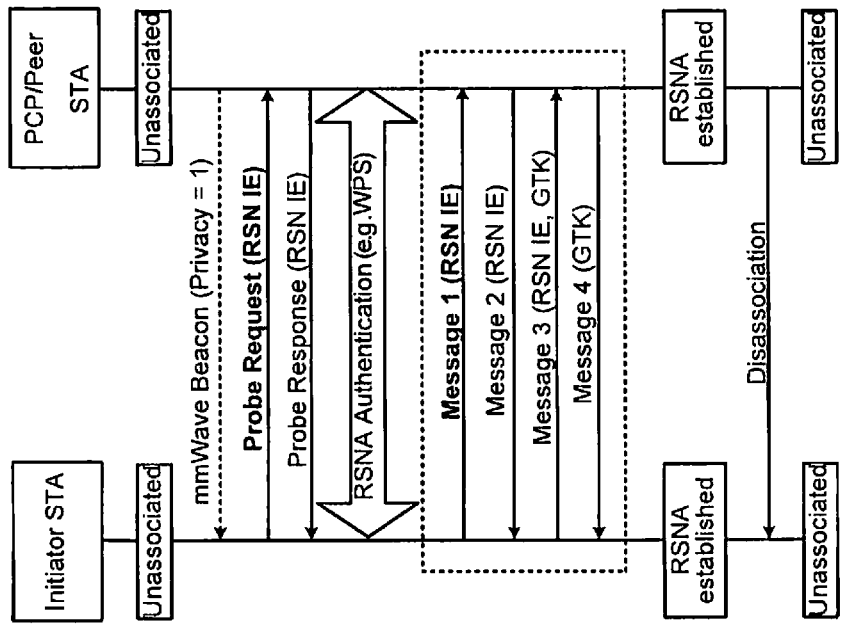
Figure 4C:
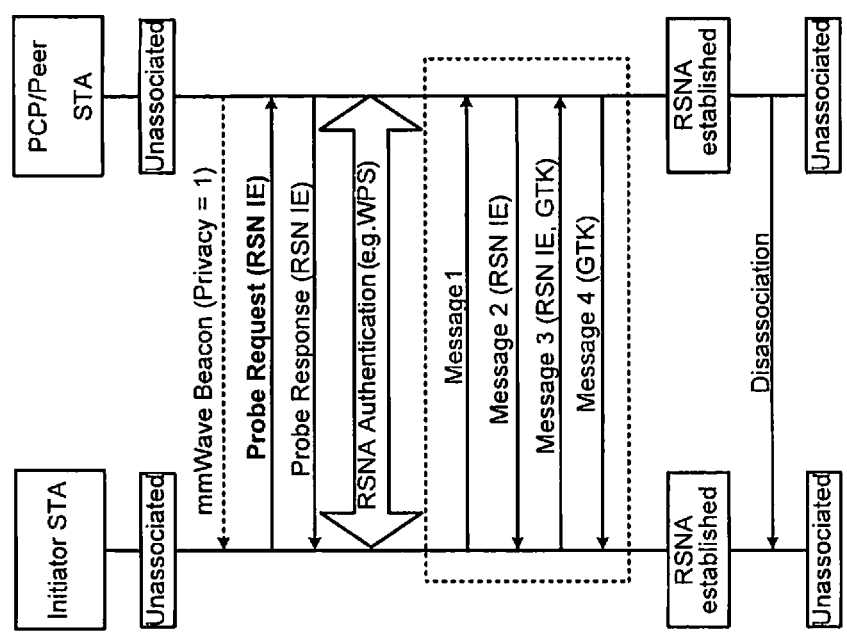

Referring now to FIG. 4C, the RSN IE may be included in a Probe Request. An initiator STA advertises the security capability of the initiator STA by including RSN IE (e.g., all supported security suites) of the initiator STA in a Probe Request or an Information Request. The peer STA includes RSN IE of the peer STA in a Probe Response or a Information Response. The RSN IE of the peer STA may include security suites selected by the peer STA or may include all security suites supported by the peer STA.

The initiator STA may perform RSNA authentication with the peer STA based on the security capabilities or security selections of the peer STA and establish a pairwise master key security association (PMKSA) with the peer STA. After the RSNA authentication, the initiator STA starts a 4-Way Handshake by sending Message 1 to the peer STA. If the RSN IE in a Probe Response includes security selections of the peer STA, the RSN IE in Message 2 is the same as the RSN IE in a Probe Response. The RSN IE in Message 3 is the same as the RSN IE in a Probe Request.

Referring now to FIG. 4D, the RSN IE may be included in Message 1 of the 4-way handshake. An initiator STA advertises security capability of the initiator STA by including RSN IE (e.g., all supported security suites) of the initiator STA in a Probe Request or an Information Request. The peer STA includes RSN IE (all supported security suites) of the peer STA in a Probe Response or an Information Response. The initiator STA may perform RSNA authentication with the peer STA based on the security capabilities of the peer STA and establish a PMKSA with the peer STA. After the RSNA authentication, the initiator STA starts a 4-Way Handshake by sending Message 1 to the peer STA. Message 1 includes the RSN IE which includes the security suites selected by the initiator STA. Message 2 repeats the RSN IE in a Probe Response or the RSN IE in Message 1. Message 3 repeats the RSN IE in a Probe Request.

If no association is used between an initiator STA and a peer STA, the initiator STA may send a RSNA Request frame to the peer STA to trigger RSNA establishment. The RSNA Request frame includes RSN IE (with one pairwise cipher suite selection and one authentication key management (AKM) suite selection) of the initiator STA. The peer STA may reject the request by discarding the RSNA Request frame or accept the request by starting a RSNA authentication or by starting a 4-Way Handshake. The peer STA may also send a RSNA Response frame to the initiator STA including an indication of whether the peer STA accepted or rejected the RSNA Request frame. If the RSNA Request is accepted, the initiator STA triggers either a RSNA authentication or a 4-Way Handshake. Alternatively, an initiator STA may also include an RSN IE (with security suites selected by the initiator STA) in a Probe Request. An initiator STA may send two or more Probe Requests to a peer STA to discover and negotiate RSN selections. The peer STA may use the first Probe Response to advertise security capabilities of the peer STA and use the other Probe Responses to negotiate RSN selections with the initiator STA.

Figure 4E:
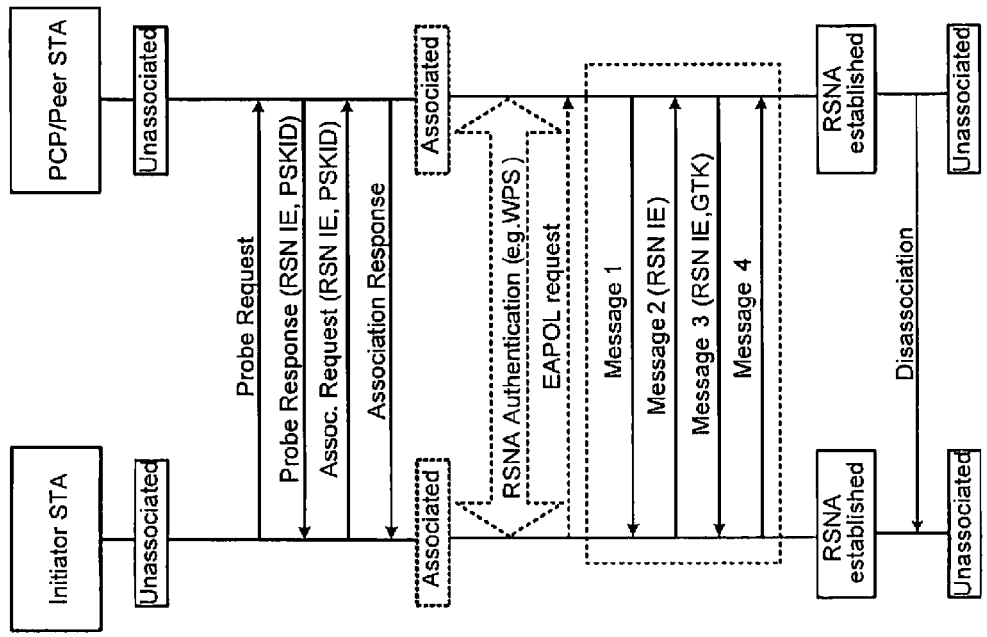
FIG. 4E depicts a direct link association (DLA) between a non-PCP/non-AP STA pair.

Referring now to FIG. 4E, a non-PCP/non-AP STA pair can communicate with each other via a Direct Link Association (DLA). An "Association" subfield is included in a mmWave STA Capability Information field to indicate whether association is required by a STA. A non-PCP/non-AP peer STA does not assign an association ID (AID) to an initiator STA. For example, an AID field in association response can be set as a broadcast AID. If the initiator STA is an enrolled STA, the initiator STA can include an RSN IE with a pre-shared key ID (PSKID) in Association Request, where PSK is the master key. The PSKID is the same as the PSKID advertised by the peer STA in Probe Response and Information Response frames of the peer STA. If two STAs start association at the same time, the STA with lower MAC address continues the association process, while the STA with higher MAC address terminates the association process.

While FIG. 4E shows Association as being separate and distinct from RSNA establishment, the Association and RSNA establishment can be integrated in one of two ways. In one implementation, a Three Way Handshake includes DLA Request, DLA Response, DLA Confirmation. RSN IE, Fast BSS Transition information element (FTIE), and temporal key (TK) lifetime are included in DLA Request, DLA Response, and DLA Confirmation frames. If PMKSA (including PSK) is already established or cached in the STA pair, PMKID is included in the DLA Request frame, the associated PMK/PSK is used to create PTK, and the DLA Response and Confirmation frames are encrypted by the PTK. If PMKSA is not yet established, DLA frames are tunneled securely through the PCP (same as TDLS). In another implementation, a 4-Way Handshake is utilized by including the necessary fields and elements in association request in message 2 and by including the necessary fields and elements in association response in message 3.

Referring now to FIGS. 5A-5D, different approaches that can be used for authentication in a PBSS are shown. For example, the approaches include a pairwise authentication approach, a centralized authentication approach, and a distributed authentication approach. The different approaches are described below in detail.

Figure 5B:
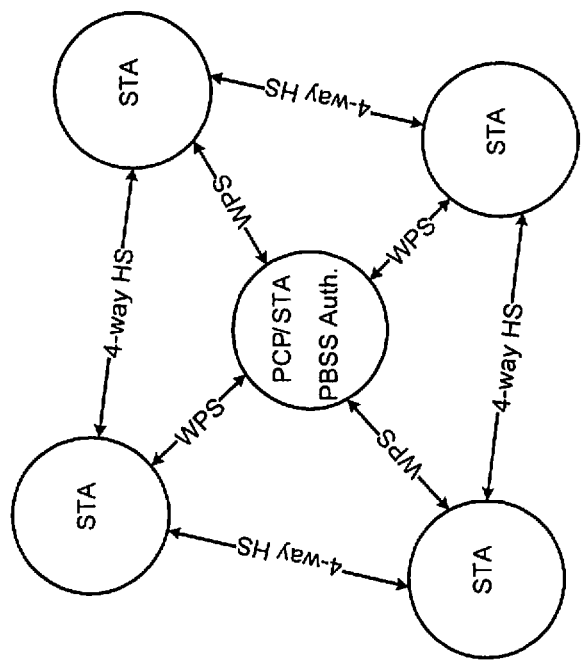
FIGS. 5A-5D depict different approaches used for authentication in a PBSS.
Figure 5A:
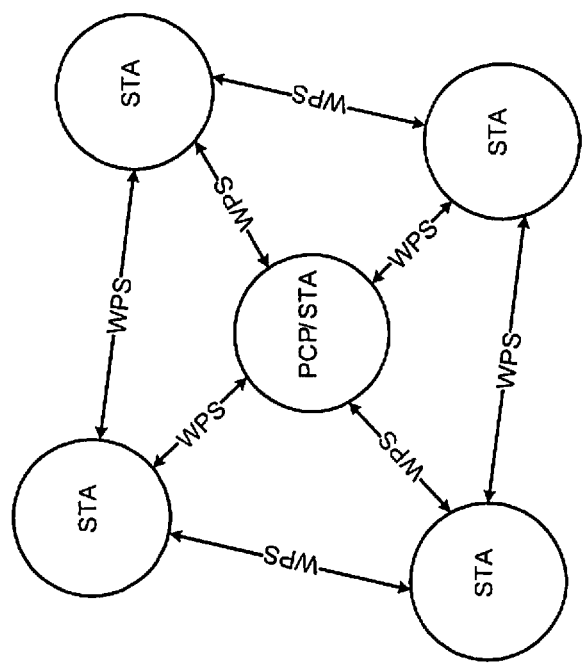

In FIG. 5A, the pairwise authentication approach is shown. Pairwise authentication is used in absence of a central security controller. Each STA conducts individual pairwise authentication (e.g., using a 10-way handshake called a wireless protocol setup (WPS) specified by the WFA) with any other STA with which the STA wants to communicate. Each STA pair may have a different pairwise master key (PMK). This approach offers consistent user experience and is easy to implement for two-device applications. This approach, however, has a complicated security setup for a PBSS with three or more STAs, and user involvement is usually needed to assist in each authentication.

In FIG. 5B, a centralized authentication approach using a common master key (CMK) in which a PCP serves as a PBSS authenticator is shown. All STAs conduct authentication (e.g., a WPS 10-way handshake) with the PCP and obtain a common master key (CMK). Non-PCP STA pair can skip pairwise authentication and derive PTK by using the CMK. In this approach, each STA only needs a single authentication with a PBSS. Accordingly, this approach offers an easy security setup for a PBSS with three or more STAs. In this approach, however, STAs always rely on PCP. Accordingly, the PCP assumes more security responsibilities in this approach.

Figure 5D:
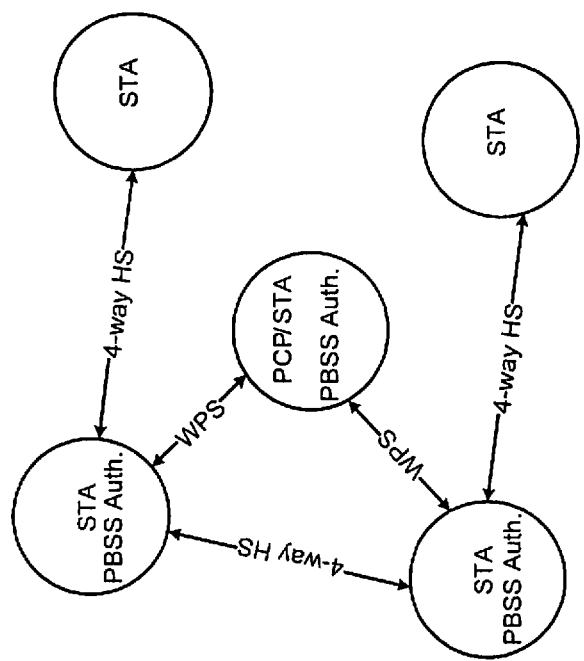
Figure 5C:
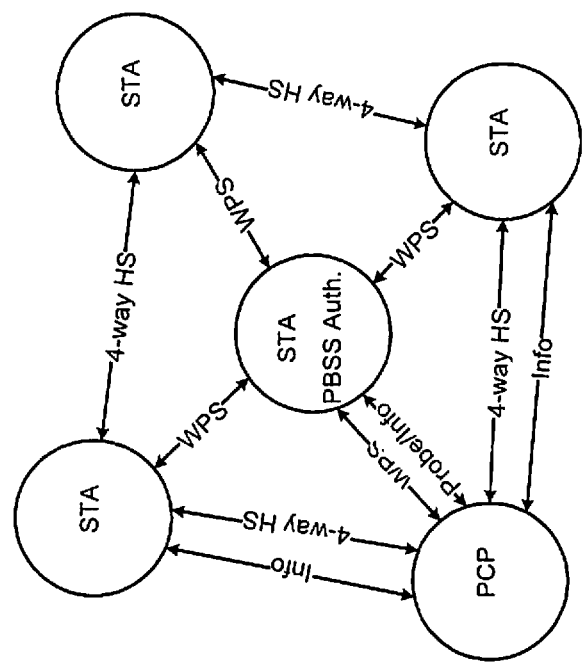

In FIG. 5C, a centralized authentication approach using a common master key (CMK) in which a STA serves as a PBSS authenticator is shown. Specifically, as explained later, a STA can become capable of serving as a PBSS authenticator/registrar. STAs capable of serving as a PBSS authenticator/registrar can inform the PCP of their capability to serve as a PBSS authenticator/registrar using a probe response frame or an information response frame. The PCP selects one of the STAs as the PBSS authenticator and conducts authentication with the PBSS authenticator.

The PCP informs all STAs that join the PBSS of the selected PBSS authenticator and the capability (e.g., RSN IE) of the selected PBSS authenticator by using information response frame. The PCP indicates in beacons or probe response frames that the PBSS is secured and requires authentication with an external PBSS authenticator or registrar. Newly joined STAs send information request to obtain the information of the PBSS authenticator. The selected PBSS authenticator also includes information indicating the role/capability of the PBSS authenticator in Probe/Information responses of the PBSS authenticator. All STAs conduct one-time authentication with the PBSS authenticator and obtain a common master key (CMK). After one-time authentication with the PBSS authenticator, a STA pair can skip pairwise authentication and derive a pairwise temporal key (PTK) by using the CMK.

In FIG. 5D, a distributed authentication approach using a common master key (CMK) is shown. The role of the PBSS authenticator can be extended from PCP or an external PBSS authenticator to any STA authenticated with the PBSS. When a STA conducts authentication with the PCP and obtains a CMK, the STA becomes a new PBSS authenticator. PBSS authenticators may advertise their roles and capabilities in Beacon and/or Probe/Information responses. The PCP may also advertise identities of the PBSS authenticators in information responses of the PCP. A new STA can choose to conduct authentication with any PBSS authenticator and obtain the CMK. Once the new STA obtains the CMK, the new STA becomes a new PBSS authenticator. Two PBSS authenticators can skip pairwise authentication and derive a pairwise temporal key (PTK) using the CMK.

PTK can be derived from CMK as follows. CMK is added as a new authentication type in authentication key management (AKM) suite selection. An "Active PBSS authenticator" field may be included in RSN capabilities field. An active PBSS authenticator enabling CMK authentication sets the "Active PBSS authenticator" field and includes a CMKID in the RSN IE (RSN IE is included in Beacons and Probe/Information Responses).

CMKID can be derived in different ways. For example, CMKID=HMAC-SHA1-128(CMK, SSID), or CMKID=HMAC-SHA1-128(CMK, BSSID). The BSSID corresponds to the PCP that initiates the PBSS. The PBSS always uses the same BSSID even if the PCP changes (or if the pre-shared key (PSK) is changed). Alternatively, CMKID=HMAC-SHA1-128(CMK, SSID∥BSSID).

A STA pair that cached the same CMK can skip pairwise authentication and derive PTK using the CMK. When CMK is used, PTK is derived in one of the following ways. {KCK, KEK, TK}=PRF-384 (CMK, "Pairwise key expansion", Min (AA, SPA)∥Max(AA, SPA)∥Min(Anonce, Snonce)∥Max (Anonce, Snonce)∥SSID). {KCK, KEK, TK}=PRF-384 (CMK, "Pairwise key expansion", Min(AA, SPA)∥Max(AA, SPA)∥Min(Anonce, Snonce)∥Max(Anonce, Snonce) ∥BSSID). {KCK, KEK, TK}=PRF-384 (CMK, "Pairwise key expansion", Min(AA, SPA)∥Max(AA, SPA)∥Min(Anonce, Snonce)∥Max(Anonce, Snonce)∥SSID∥BSSID).

In the acronyms used herein, KCK denotes an EAPOL-Key confirmation key. KEK denotes an EAPOL-Key encryption key. TK denotes a temporal key. PRF denotes a pseudo-random function. AA denotes a MAC address of the authenticator. SPA denotes a MAC address of a supplicant.

In some implementations, the pre-shared key (PSK) can be reused. An "Active PBSS authenticator" field may be included in RSN capabilities field. A PBSS authenticator enabling CMK authentication uses RSNA-PSK authentication and includes a PSKID in the RSN IE (RSN IE is included in Beacons and Probe/Information Responses). PSKID can be included in PMKID list or as a new field in RSN IE. PSKID can be derived in one of the following ways. PSKID=HMAC-SHA1-128(PSK, SSID). PSKID=HMAC-SHA1-128(PSK, BSSID), where BSSID corresponds to the PCP that initiates the PBSS. The PBSS always uses the same BSSID even if the PCP changes (or if PSK is changed). Alternatively, PSKID=HMAC-SHA1-128(PSK, SSID∥BSSID).

The PBSS authenticator configures a common PSK associated with the PSKID to all STAs in the same PBSS. A STA pair that cached the same PSK can skip pairwise authentication and derive PTK using the PSK. When the common PSK is used, PTK is derived in one of the following ways. {KCK, KEK, TK}=PRF-384 (PSK, "Pairwise key expansion", Min (AA, SPA)∥Max(AA, SPA)∥Min(Anonce, Snonce)∥Max (Anonce, Snonce)∥SSID). {KCK, KEK, TK}=PRF-384 (PSK, "Pairwise key expansion", Min(AA, SPA)∥Max(AA, SPA)∥Min(Anonce, Snonce)∥Max(Anonce, Snonce) ∥BSSID). {KCK, KEK, TK}=PRF-384 (PSK, "Pairwise key expansion", Min(AA, SPA)∥Max(AA, SPA)∥Min(Anonce, Snonce)∥Max(Anonce, Snonce)∥SSID∥BSSID). As used herein, CMK (Common Master Key) and Common PSK (CSK) mean the same thing, and CSKID and PSKID mean the same thing. Other acronyms used are the same as those defined earlier and are therefore not repeated.

Figure 6B:
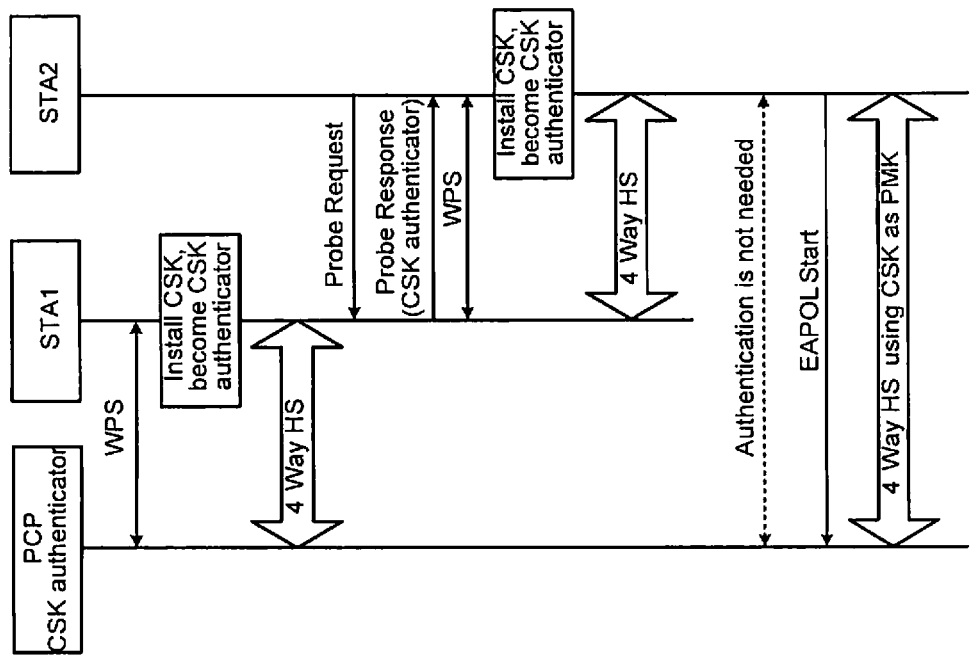
FIG. 6B depicts a method for establishing STA-to-STA security associations in a PBSS.
Figure 6A:
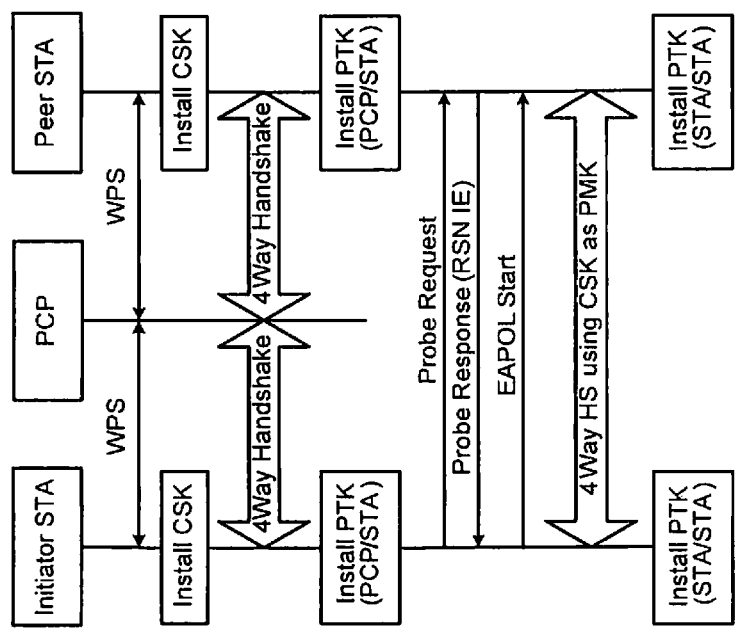
FIG. 6A depicts a method for establishing RSNA between an initiator STA and a peer STA using a common pre-shared key (CSK)

Referring now to FIGS. 6A and 6B, a method used by a STA to become an authenticator in a PBSS is now explained. Generally, in a PBSS, if a pre-shared key (PSK) is used, a PSK is obtained in each pairwise link, including PCP-to-STA links and STA-to-STA links. Different PSKs may be used for different pairwise links. For example, a PCP-to-STA link may use a different PSK than a STA-to-STA link. A 4-Way Handshake is used to establish a pairwise transient key security association (PTKSA). If a common PSK (i.e., CSK) is used, each STA can first establish RSNA with PCP and obtain the CSK. The STAs can then use the CSK as the pairwise master key (PMK) to establish RSNA with peer STAs. A 4-Way Handshake is used to establish PTKSA. A common PSK (i.e., CSK) cannot be used, however, if PCP does not support CSK.

In FIG. 6A, a method typically used to establish RSNA between an initiator STA and a peer STA using CSK is shown. Initially, the initiator STA and the peer STA obtain CSK from the PCP using a wireless protocol setup (WPS) developed by the Wi-Fi Alliance (WFA). Subsequently, the initiator STA and the peer STA perform a 4-way handshake with the PCP to generate a PTK. Thereafter, the initiator STA sends a probe request to the peer STA. The peer STA sends a probe response to the initiator STA, which includes RSN IE of the peer STA. The initiator STA and the peer STA then perform a 4-way handshake with each other to generate a PTK, which the initiator STA and the peer STA can use to encrypt data to be exchanged by the initiator STA and the peer STA. If both the initiator STA and the peer STA attempt to start the 4-way handshake with each other at the same time (i.e., if a race condition occurs), the STA with higher MAC address terminates the 4-way handshake, and the STA with lower MAC address continues the 4-way handshake. Thus, when CSK is used, the initiator STA and the peer STA first obtains the CSK from the PCP before the initiator STA and the peer STA can establish RSNA with each other even if the initiator STA and the peer STA do not wish to communicate with the PCP.

PCP-to-STA security associations in a PBSS can be similar to AP-to-STA security associations in a BSS/ESS. In BSS/ESS and in PBSS with association cases, a STA obtains a RSN IE (i.e., security capabilities and policies) of the AP/PCP via beacons or probe responses received from the AP/PCP, and the AP/PCP obtains a RSN IE of the STA via association requests received from the STA. In a PBSS, however, a STA need not associate with a PCP. Accordingly, establishing STA-to-STA security associations in a PBSS without associating with a PCP can be challenging.

According to the present disclosure, STA-to-STA security associations in a PBSS can be established without associating with a PCP. Specifically, a STA can choose to authenticate with any STA in a PBSS. Once a STA authenticates with any secured member of a PBSS, the STA does not need to authenticate with other members of the PBSS any more. Rather, as explained below, the STA becomes an authenticator and can authenticate any member that joins the network.

In FIG. 6B, a method for establishing STA-to-STA security associations in a PBSS according to the present disclosure is shown. A first STA (STA1) may communicate with a PCP using WPS, obtain CSK from the PCP, and become a CSK authenticator. A CSK authenticator (e.g., a PCP or a STA that has become a CSK authenticator) has the authority to establish RSNA with any other unsecured member of the PBSS. Subsequently, if STA1 wishes to communicate with the PCP, STA1 can perform a 4-way handshake with the PCP, generate PTK, and securely exchange data encrypted using the PTK with the PCP.

Alternatively, STA1 need not associate with the PCP. Instead, STA1 can establish RSNA with a second STA (STA2) in the PBSS.

After STA1 becomes a CSK authenticator, STA2 can initiate communication with STA1. Since STA1 is a CSK authenticator, STA2 need not first establish RSNA with the PCP before communicating with STA1. Instead, STA2 simply sends a probe request to STA1. STA1 sends a probe response to STA2. STA2 obtains the CSK from STA1 using WPS and becomes a CSK authenticator. Additionally, STA2 and STA1 perform a 4-way handshake with each other, generate a PTK using the CSK, and securely exchange data encrypted using the PTK. When two CSK authenticators (e.g., PCP-STA1, PCP-STA2, or STA1-STA2) want to establish CSK-based RSNA, the two CSK authenticators may skip authentication and directly use the CSK to derive a PTK via 4-Way Handshake. The two CSK authenticators can then securely exchange data encrypted using the PTK.

Once a STA becomes a CSK authenticator (CSK authenticator STA), the CSK authenticator STA can generate a CSKID based on the CSK and the SSID of the PBSS. The CSK authenticator STA can advertise the CSKID via an RSN IE included in a probe request transmitted by the CSK authenticator STA. Accordingly, a new STA joining the PBSS and wanting to communicate with a CSK authenticator STA can obtain the CSK from the CSK authenticator STA or any other CSK authenticator STA. Once the new STA installs the CSK, the new STA can skip authentication with any of the other CSK authenticators and instead directly perform a 4-way handshake with a CSK authenticator STA to generate a PTK. The CSK authenticator STA and the new STA can then securely exchange data encrypted using the PTK.

Alternatively, since all STAs enrolled in a PBSS are assumed to share the same PSK, two STAs wanting to communicate with each other can simply indicate their enrollment status in a RSN capabilities field or similar information element. In some implementations, an initiator STA can simply start a 4-way handshake with a peer STA to determine if the peer STA uses the same PSK as the PSK installed in the initiator STA. If the 4-way handshake indicates that the two STAs use the same PSK, then the two STAs can generate a PTK using the PSK and securely exchange data encrypted using the PTK. If the 4-way handshake indicates that the two STAs do not use the same PSK, then the two STAs can determine that a secure connection cannot be established between the two STAs.

Thus, once a STA has a one-time authentication with "any" STA in the PBSS, the STA possesses a common PMK with any other STA in the PBSS so that further authentications can be skipped. "Any" STA knows the common PMK and configures the common PMK to a new STA during the one-time authentication. In one implementation, this "any" STA becomes an authenticator of the PBSS. Once a new STA completes the one-time authentication with a PBSS, the new STA becomes a new authenticator of the PBSS. If the PCP of the PBSS leaves the network, the PCP role of the PBSS changes frequently and dynamically, or if the PBSS is frequently on and off, the same common PMK identified by a common PMK ID can be still used in the PBSS.

If a guest STA is allowed to enter the PBSS by using common PMK mode, the guest STA becomes an authenticator of the PBSS. If a guest STA is not allowed to enter the PBSS by using common PMK mode, the guest STA may still do pairwise authentication with a member of the PBSS if the member STA is capable of pairwise authentication (using a PMK different than the common PMK).

Alternatively, if a PCP is CSK-capable, the PCP may form a CSK-based PBSS. When a STA joins the PBSS, the STA may initiate authentication with PCP and get the CSK from the PCP. Once the STA gets the CSK from the PCP, the STA is authorized by the PCP to authenticate other STAs joining the PBSS. The STA advertises the role of the STA as a CSK authenticator in Probe Response or Information Response frames of the STA. A new STA joining the PBSS may choose to establish a CSK-based RSNA with either PCP or any STA serving as CSK authenticator. Once the new STA gets the CSK from the PCP or a CSK authenticator, the new STA is also authorized as a new CSK authenticator.

When two CSK authenticators want to establish CSK-based RSNA, the two CSK authenticators may skip the authentication process and directly use the CSK to derive PTK (via 4-Way Handshake). STA-to-STA PTK derivation can be expressed as follows. {KCK, KEK, TK}=PRF-384 (CSK, "Pairwise key expansion", Min(AA, SPA)||Max(AA, SPA)||Min(Anonce, Snonce)||Max(Anonce, Snonce)||BSSID or SSID). If both STAs start 4-Way Handshake at the same time, the STA with lower MAC address continues the 4-Way Handshake, while the STA with higher MAC address terminates the 4-Way Handshake.

CSKID can be expressed as follows. CSKID=HMAC-SHA1-128(CSK, Network Name/ID|| . . . ). The Network Name/ID can be the SSID of the PBSS or other Network Name/ID common to the whole PBSS/Network. When a STA becomes a CSK authenticator of a PBSS and enables the CSK authentication suite in the RSN IE of the STA, the STA also includes the CSKID in the PMKID list or in a new CSKID field of the RSN IE. Any other STA that possesses the same CSK, which is identified by the CSKID, can skip the authentication and start a 4-Way Handshake with the CSK authenticator using the same CSK. A PCP/STA can update a CSK in a PBSS by sending a CSK update notice (with new CSKID) to all secured members of the PBSS and also by advertising the new CSKID in the RSN IE. The members have to do authentication again with a PBSS authenticator possessing the new CSK and obtain the new CSK.

PBSS registration is now explained. At least one PBSS Registrar is present in a PBSS. A PBSS Registrar can include a wireless protocol setup (WPS) information element (WPS IE) in the Probe Response, Information Response, and/or mm Wave Beacon frames. An "Active PBSS Registrar" subfield can also be added in RSN capability or STA capability field (included in the Probe Response, Information Response, and/ or mm Wave Beacon frames). A PBSS Registrar can add a new member to the PBSS, for example, by using WPS. After a successful registration, a PSK is installed in the new member. All STAs enrolled in a PBSS install the same PSK.

Two enrolled STAs that share the same PSK can use the PSK to establish RSNA without pairwise RSNA authentication/registration. The two STAs can determine that the two STAs share the same PSK using one of the following options. In a first option, an enrolled STA, including PBSS registrar, includes a PSKID in RSN IE (e.g., included in a PMKID List field) if the enrolled STA intends to use PSK for pairwise authentication. The RSN IE with the PSKID can be included in Probe Response, Information Response, and mm Wave Beacon frames. PSKID can be expressed as PSKID=HMAC-SHA1-128(PSK, SSID).

In a second option, all enrolled STAs are assumed to share the same PSK. Accordingly, two STAs only need to ensure that the two STAs are enrolled. An "Enrolled STA" subfield is included in RSN capability or STA capability field. Alternatively, an "Enrolled STA" subfield can be identified by the AID subfield in mm Wave Capabilities element and RSN element in Probe Response and Information Response frames. A PBSS registrar is always considered to be an enrolled STA. In a third option, an initiator STA simply starts a 4-Way Handshake to try/test a peer STA and determines whether the peer STA uses the same PSK based on the success or failure of the 4-way handshake.

Figure 7A:
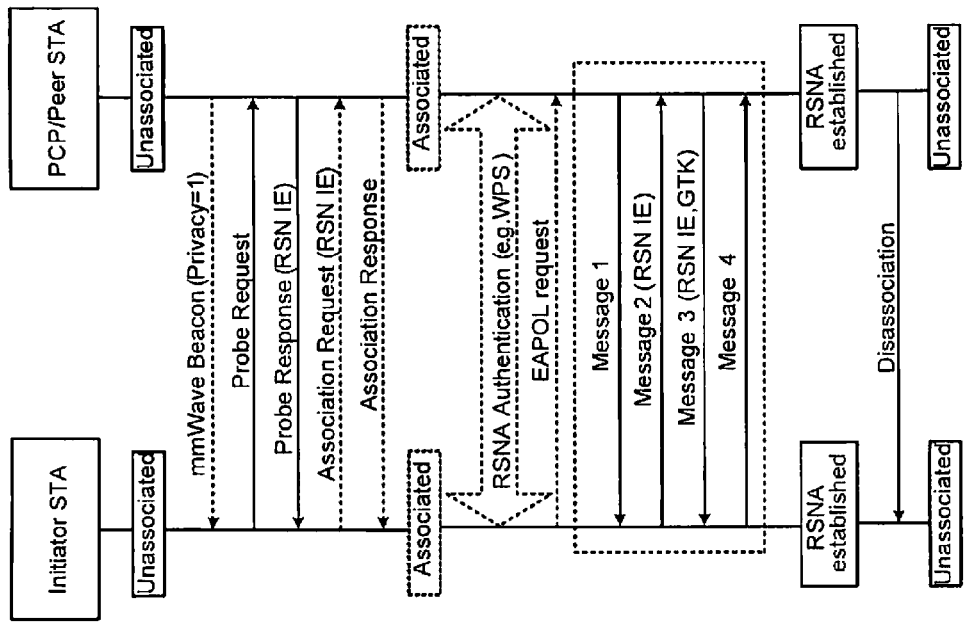
FIGS. 7A-7E depict different methods for establishing RSNA between two members of a PBSS.

Referring now to FIGS. 7A-7E, different methods for establishing RSNA between two members of a PBSS according to the present disclosure are shown. In FIG. 7A, the two members may be an initiator STA that is not a CSK authenticator and a PCP, an initiator STA that is a CSK authenticator and a PCP, an initiator STA that is not a CSK authenticator and a peer STA that is a CSK authenticator, an initiator STA that is a CSK authenticator and a peer STA that is not a CSK authenticator, or an initiator STA and a peer STA both of which are CSK authenticators. Depending on the status of one or both of the two members (i.e., whether the member is a CSK authenticator), the two members may perform authentication or may skip authentication; one of the two members may associate with the PCP or may not associate with the PCP; one of the two members may setup RSNA with a peer STA instead of a PCP; both members may skip authentication and directly setup RSNA; and so on. The different methods for establishing RSNA according to the present disclosure are described below in detail.

Figure 7C:
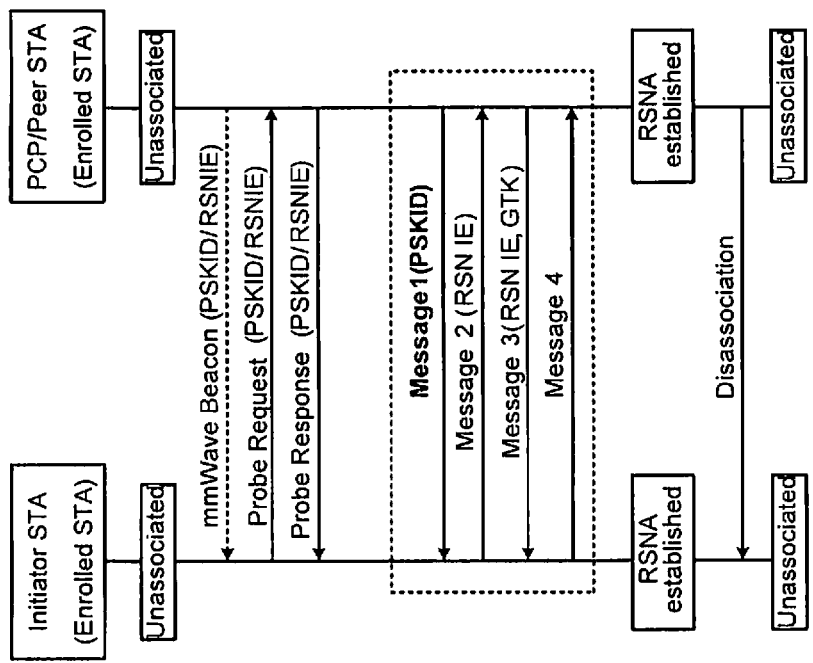
Figure 7B:
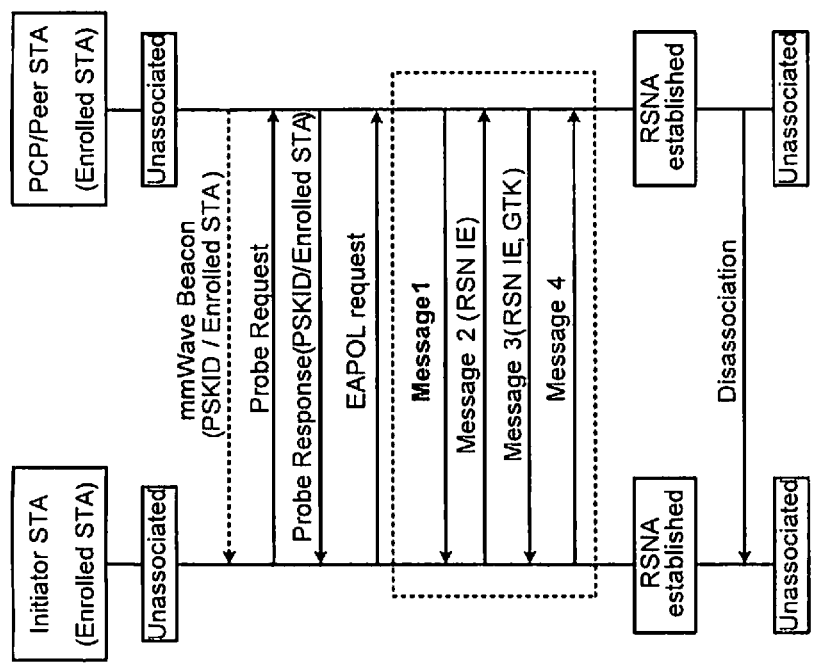

In FIG. 7B, an initiator STA (enrolled STA) discovers security capability of a peer STA using Probe Request/Response or Information Request/Response as shown. If the peer STA shares the same PSK as the initiator STA, or if the peer STA is identified as an enrolled STA, the initiator STA can directly trigger a 4-Way Handshake to verify PSK and to generate PTK as shown. When a peer STA (enrolled STA and/or advertising PSKID) receives an EAPOL request and determines that there is no pairwise master key security association (PMKSA) with the initiator STA, the peer STA uses the common PSK as RSNA authentication and starts a 4-Way Handshake. If both STAs trigger the RSNA establishment at the same time, the STA with the lower MAC address continues with the process.

In FIG. 7C, an initiator STA (enrolled STA) advertises the security capability of the initiator STA by including a RSN IE of the initiator STA (indicating all supported security suites) in a Probe Request or an Information Request. If PSK is used, the PSKID is included in the RSN IE. The peer STA includes a RSN IE of the peer STA in a Probe Response or an Information Response. The RSN IE of the peer STA includes security suites selected by the peer STA. (If PSK is used, PSKID is included in the RSN IE.) Alternatively, the RSN IE of the peer STA includes all security suites supported by the peer STA. If the peer STA shares the same PSK as the initiator STA, the initiator STA starts a 4-Way Handshake (using the PSK) by sending Message 1 to the peer STA. If the RSN IE in a Probe Response includes the security selections of the peer STA, the RSN IE in Message 2 is the same as the RSN IE in a Probe Response. The RSN IE in Message 3 is the same as the RSN IE in a Probe Request.

Figure 7E:
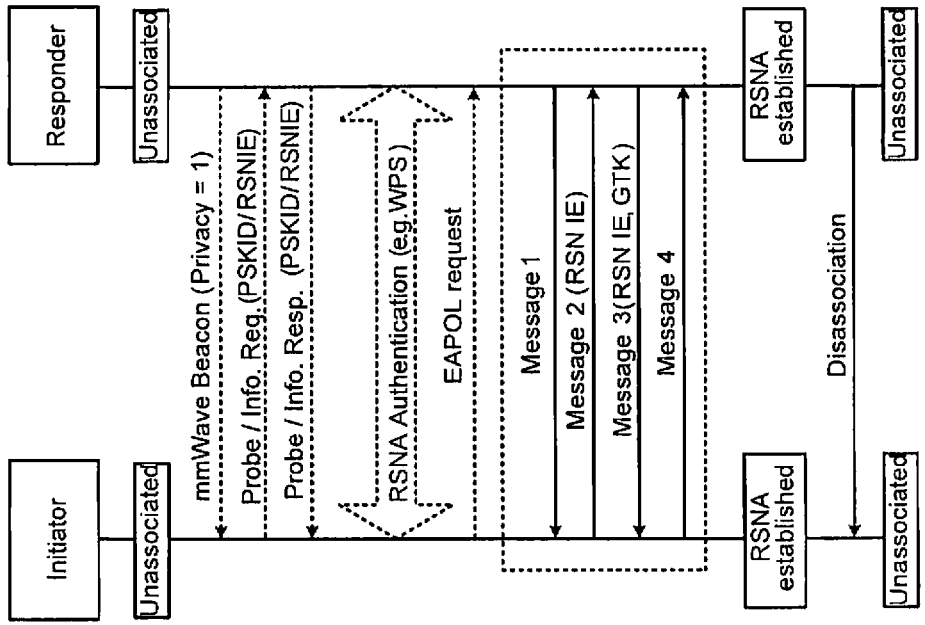
Figure 7D:
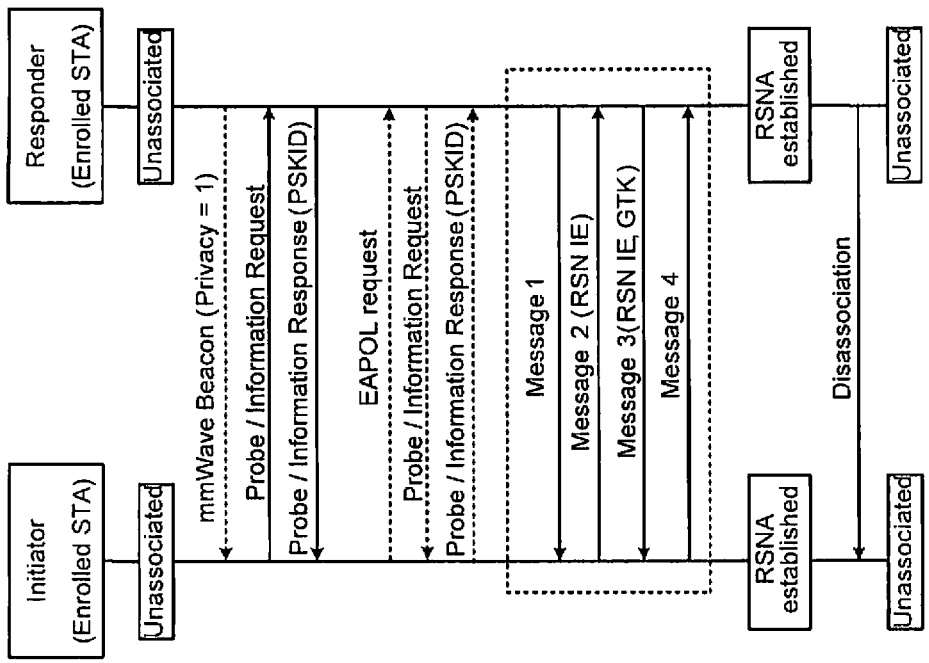

In FIGS. 7D and 7E, a responder STA (enrolled STA) may need to send Probe/Information request to the initiator STA for the RSNA information of the initiator STA as shown in FIG. 7D. In FIG. 7E, the Probe/Information request from the initiator STA can include the RSN IE of the initiator STA for quick RSNA information exchange as shown. Otherwise, a responder STA (enrolled STA) may need to send Probe/Information request to the initiator STA for the RSNA information of the initiator STA as shown in FIG. 7D.

Figures 8A, 8B:
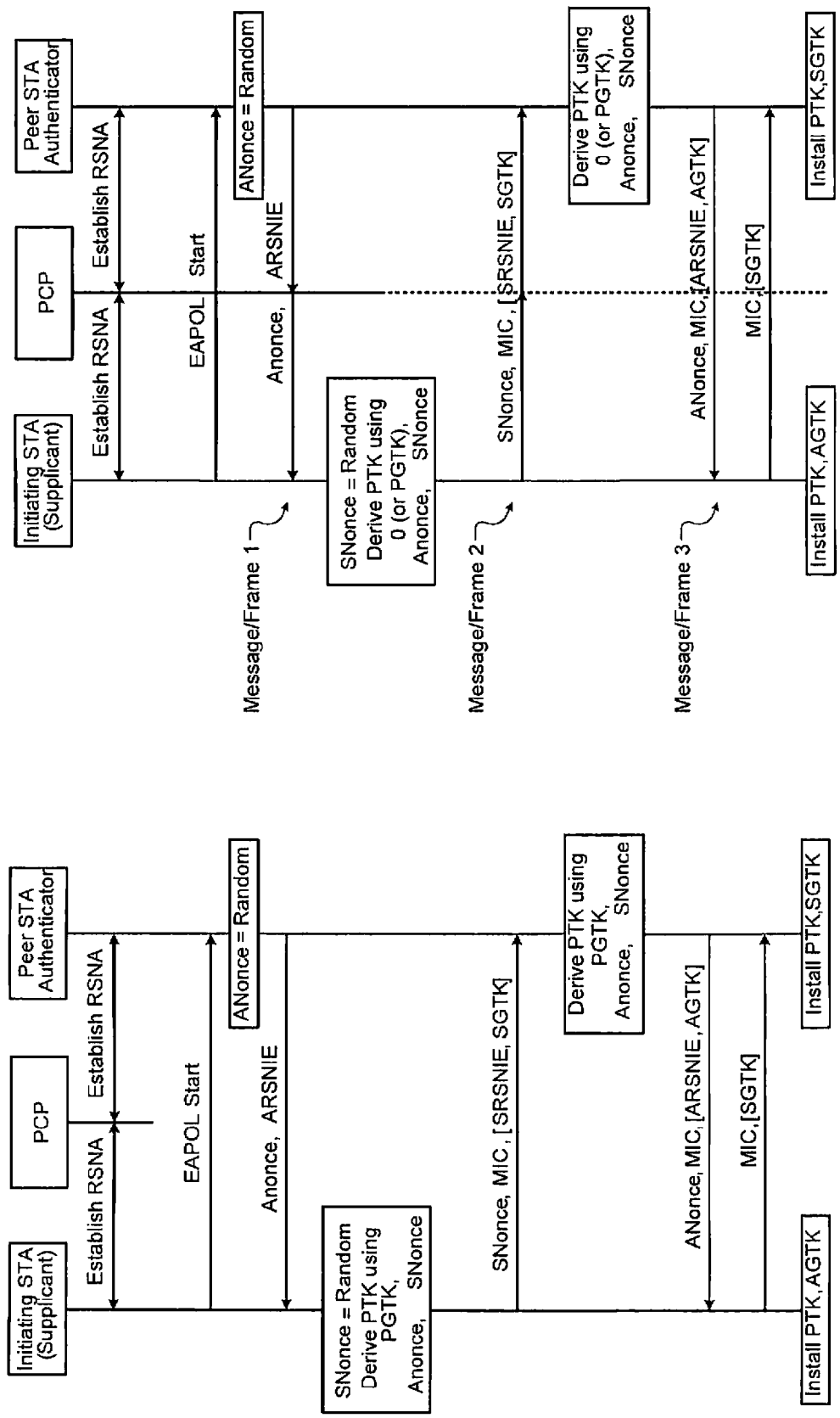
FIG. 8A depicts station-to-station (S2S) security association using PCP-generated pairwise master key (PMK)
FIG. 8B depicts station-to-station (S2S) security association using zero PMK.

Referring now to FIGS. 8A and 8B, in PCP-to-STA security associations, 802.1x and other options can be used for pairwise master key security association (PMKSA). In the 4-Way Handshake, if non-PCP STA is allowed to a create group transient key security association (GTKSA), the non-PCP STA may include a GTK key data encapsulation (KDE) of the non-PCP STA in message 2 or message 4 of the 4-Way Handshake.

In STA-to-STA security associations, STA-to-STA authentication key management (AKM) suites can be different than PCP-to-STA AKM suites. For example, STA-to-STA (S2S) AKM suites can include S2S 802.1x, S2S PSK, S2S PCP-generated PMK, and S2S Zero PMK. With respect to S2S 802.1x and S2S PSK, a STA pair establishes a pairwise master key security association (PMKSA) using 802.1x or PSK. The PMKSA between the STA pair is independent of the security relationship between the STAs and PCP. For example, a STA can use common PSK with PCP and use S2S PSK with a peer STA. A 4-Way Handshake is used to establish PTKSA. If either or both STAs have respective GTKSA, the STAs may include GTK KDE in message 3 and/or message 2 or 4 of 4-Way Handshake.

With respect to S2S PCP-generated PMK, both STAs establish RSNA with the PCP. The STA pair may have different PMKs with the PCP. In a 4-Way handshake with each of the STAs, the PCP includes a S2S PMK (same for the STA pair) in message 3 of the 4-Way Handshake. The STA pair uses the PMK generated by the PCP to establish RSNA between the STA pair. A 4-Way Handshake is used to establish PTKSA. Alternatively, the PCP may generate a PMK common to all STA pairs in the PBSS. The GTK from PCP can be used as a common PMK to all STA pairs in the PBSS. The GTK from PCP can be used as the PTK and GTK between all STA pairs.

In FIG. 8A, the S2S PCP-generated PMK is shown in detail. Initially, both STAs establish RSNA with the PCP and obtain PCP-generated PMK. Alternatively, the PCP group temporal key (PGTK) is used as the PMK to derive PTK. Thereafter, the PTK between the two STAs can be derived from the PCP-generated PMK or PGTK. If both STAs have their own GTK (i.e. AGTK—Authenticator's GTK, SGTK—Supplicant's GTK), both STAs can exchange each other's GTKs using 4-Way Handshake messages.

With respect to S2S Zero PMK, both STAs establish RSNA with the PCP. The STA pair may have different PMKs with the PCP. PMK is set to zero. A pairwise transient key security association (PTKSA) is established using 3-Way or 4-Way Handshake securely tunneled through PCP. If either or both STAs have their own GTKSA, the STAs may include a GTK KDE in message 3 and/or message 2 or 4 of the tunneled Handshake.

Alternatively, only Message 1 and 2 need to be securely tunneled in order to protect Nonces from both STAs. Message 3 (and 4) can be sent directly between peer STAs. In Message 3, Nonce is included in Key Data, and Message 3 is encrypted. In some implementations, only Message 1 needs to be securely tunneled in order to protect Nonce from Authenticator. Message 2, 3 (and 4) can be sent directly between peer STAs. In Message 3, Nonce is included in Key Data, and Message 3 is encrypted.

In some implementations, PMK can also be set as GTK of PCP. In other implementations, the 3 or 4 Way Handshake may be replaced by the exchange (also tunneling) of 3 or 4 management/action frames (with RSN IE and Fast BSS Transition information element (FTIE)). Alternatively, Message 1 and/or Message 2 can be replaced by a management/action frame (with RSN IE and FTIE). Message 3 (and 4) can be sent directly between peer STAs. The management/action frames can be Probe Request/Response frames, Information Request/Response frames, RSNA Setup Request/Response frames, and/or a RSNA confirmation frame.

In FIG. 8B, the S2S Zero PMK is shown in detail. As shown, Message/Frame 1 is tunneled through the PCP to protect ANonce, and Message/Frame 2 is tunneled through the PCP to protect SNonce. Further, ANonce is included in Key Data field of Message 3 to be encrypted as shown.

If a STA initiates RSNA with a peer STA, the initiating STA sends an EAPOL-Start message to the peer STA to start the RSNA authentication. If a STA receives an EAPOL-Start message after the STA sends an EAPOL-Start message, but before the STA receives a response message, the following procedure is used. If the source MAC address of the received EAPOL-Start message is higher than the MAC address of the STA, the STA discards the message silently (i.e., without sending any response message). If the source MAC address of the received EAPOL-Start message is lower than the MAC address of the STA, the STA terminates the RSNA initiated by the STA and sends a response message.

Figure 9:
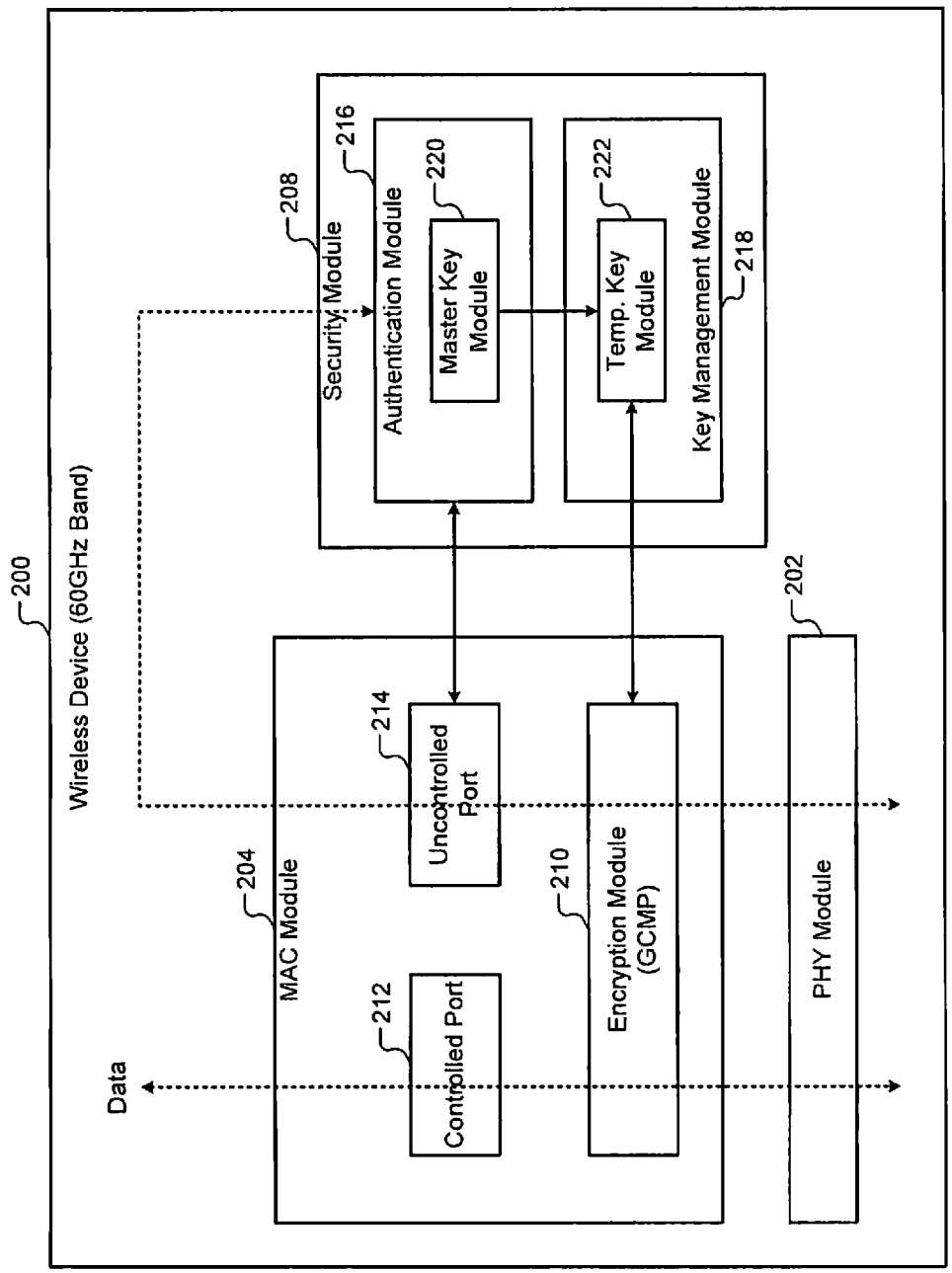
FIG. 9 is a functional block diagram of a wireless device.

Referring now to FIG. 9, a wireless device 200 capable of communicating in a 60 GHz band according to specifications defined by the Wireless Gigabit Alliance (WGA) is shown. The wireless device 200 is configured to implement any device referenced in the claims (e.g., the first and second wireless devices) and in the description of FIGS. 1C through 8B. For example, the wireless device 200 can implement any device including but not limited to a PCP, a registrar, a STA, a peer STA, an initiator, a responder, an authenticator, a supplicant, a wireless station, and so on. The wireless device 200 can also operate in multiple bands in addition to the 60 GHz band (e.g., 2.4 GHz/5 GHz bands) and can use different encryption protocols. For example, the wireless device 200 can encrypt data using Galois/Counter Mode Protocol (GCMP) and/or counter mode (CTR) with cipher-block chaining (CBC)-MAC protocol (CCMP).

The wireless device 200 includes a PITY module 202, a MAC module 204, and a security module 208. The PHY module 202 interfaces the wireless device 200 to a wireless communication medium (e.g., air) via one or more antennas (not shown) in the 60 GHz band (and/or other bands). The MAC module 204 controls access of the wireless device 200 to the wireless communication medium in the 60 GHz band (and/or other bands). The security module 208 manages security of data communicated by the wireless device 200 over the wireless communication medium in the 60 GHz band (and/or other bands).

The MAC module 204 includes an encryption module 210, a controlled port 212, and an uncontrolled port 214. The encryption module 210 encrypts data using, for example, Galois/Counter Mode Protocol (GCMP). The controlled port 212 is used to transport encrypted data securely when encryption is used. The uncontrolled port 214 is used to transport unencrypted data.

The security module 208 performs association, authentication, registration, RSNA establishment, and/or 4-way handshaking using the different methods described with reference to FIGS. 2A through 8B (hereinafter the different methods). The security module 208 includes an authentication module 216 and a key management module 218. The authentication module 216 authenticates communications of the wireless device 200 with other devices (e.g., in a PBSS) using the different methods. The key management module 218 generates keys that the encryption module 210 uses to encrypt data using the different methods.

The authentication module 216 includes a master key module 220. The master key module 220 obtains or generates a master key (e.g., a pairwise master key (PMK)) for a communication session of the wireless device 200 in the 60 GHz band (and/or other bands) using the different methods. The key management module 218 includes a temporal key module 222. The temporal key module 222 generates a temporal key (e.g., a pairwise transient key (PTK)) based on the mater key using the different methods. In addition, the master key module 220 and the key management module 218 generate other keys as described in the present disclosure. The encryption module 220 encrypts data using the temporal key.

In summary, in a PBSS, an initiator STA can establish RSNA with a peer STA (including PCP or non-PCP STA) without associating to the PBSS/PCP, and also without associating with each other. To establish RSNA in this manner, both STAs use special messages (other than association frames) to exchange security capability information, and also trigger RSNA set up, that is, authentication (if needed) and 4-Way Handshake. Only a single authentication (if needed) and a single 4-Way handshake are conducted between the peer STAs. When two STAs start RSNA at the same time, the STA with the lower MAC address continues to establish RSNA, and the STA with the higher MAC address discontinues establishing RSNA.

A common master key can be used in a PBSS to facilitate RSNA setup between peer STAs. The common master key can be configured to each STA manually (e.g., PSK) or be assigned by a PBSS authenticator. The PBSS authenticator can be the PCP, a special STA, or a special group of STAs, or a STA that successfully installs a common master key. Two STAs that have installed the same master key can skip mutual authentication, and directly conduct a 4-Way handshake to set up P2P RSNA. A STA that has installed a common master key can include a key ID or a special indication in advertisement messages transmitted by the STA. When an initiator STA finds a peer STA having installed a same master key as itself (by checking the advertising messages of the peer STA), the initiator STA can directly initiate 4-Way Handshake with the peer STA w/o the authentication step. The key ID for the common master key is derived from the master key and the network ID and other information.

An initiating STA can also use special message exchanges (other than 4-Way Handshake) to conduct the following three tasks at the same time a) exchange capabilities information, b) associate with each other, and c) establish RSNA. Some of the special messages can be tunneled through the PCP. The messages tunneled through the PCP are protected by the secured links between STAs and the PCP.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A personal basic service set (PBSS) comprising:
a first wireless device configured to communicate in the PBSS, wherein the first wireless device includes a first station of the PBSS; and
a second wireless device configured to communicate in the PBSS, wherein the second wireless device includes a second station of the PBSS or a PBSS control point (PCP),
wherein the first wireless device and the second wireless device are further configured to exchange security capabilities of each other using messages other than association frames, and
wherein the first wireless device is configured to establish a robust security network association (RSNA) with the second wireless device (i) without associating with the PCP and (ii) without associating with the second wireless device.

2. The PBSS of claim 1, wherein the first wireless device and the second wireless device are further configured to:
selectively perform a single authentication procedure; and
perform a single 4-way handshake.

3. The PBSS of claim 1, wherein:
the first wireless device has a first medium access control (MAC) address;
the second wireless device has a second MAC address; and
in response to the first wireless device and the second wireless device attempting to establish the RSNA at the same time,
the first wireless device is further configured to continue establishing the RSNA and the second wireless device is further configured to discontinue establishing the RSNA in response to the first MAC address being lower than the second MAC address, or
the second wireless device is further configured to continue establishing the RSNA and the first wireless device is further configured to discontinue establishing the RSNA in response to the second MAC address being lower than the first MAC address.

4. The PBSS of claim 1, wherein the first wireless device and the second wireless device are further configured to establish the RSNA using a common master key, wherein the common master key is (i) a pre-shared key input into the first wireless device and the second wireless device or (ii) assigned by a PBSS authenticator, and wherein the PBSS authenticator includes the PBSS control point (PCP), a station or a group of stations of the PBSS authorized as the PBSS authenticator, or a station of the PBSS configured to install the common master key.

5. The PBSS of claim 1, wherein the first wireless device and the second wireless device are further configured to (i) skip mutual authentication and (ii) conduct a 4-way handshake to establish the RSNA in response to determining that a same master key is installed in the first wireless device and the second wireless device.

6. The PBSS of claim 1, wherein at least one of the first wireless device and the second wireless device is further configured to include a key identifier in an advertisement message, wherein the key identifier (i) indicates that a common master key is installed in the respective wireless device and (ii) is generated based on the common master key and a network identifier of the PBSS.

7. The PBSS of claim 1, wherein:
the first wireless device is further configured to determine, based on an advertisement message received from the second wireless device, whether a common master key is installed in the first wireless device and the second wireless device; and
in response to determining that the common master is installed in the first wireless device and the second wireless device, the first wireless device is further configured to (i) skip mutual authentication and (ii) conduct a 4-way handshake with the second wireless device to establish the RSNA.

8. The PBSS of claim 1, wherein the first wireless device and the second wireless device are further configured to exchange messages other than a 4-way handshake to perform the following at the same time: (i) exchange security capabilities of each other, (ii) associate with each other, and (iii) establish the RSNA.

9. The PBSS of claim 8, wherein the first wireless device and the second wireless device are further configured to tunnel at least one of the messages through the PBSS control point (PCP).

10. A method for a personal basic service set (PBSS), the method comprising:
    communicating in the PBSS using a first wireless device, wherein the first wireless device includes a first station of the PBSS;
    communicating in the PBSS using a second wireless device, wherein the second wireless device includes a second station of the PBSS or a PBSS control point (PCP);
    exchanging security capabilities of the first wireless device and the second wireless device using messages other than association frames; and
    establishing, using the first wireless device, a robust security network association (RSNA) with the second wireless device (i) without associating with the PCP and (ii) without associating with the second wireless device.

11. The method of claim 10, further comprising:
    selectively performing a single authentication procedure; and
    performing a single 4-way handshake.

12. The method of claim 10, wherein the first wireless device has a first medium access control (MAC) address, and the second wireless device has a second MAC address, the method further comprising, in response to the first wireless device and the second wireless device attempting to establish the RSNA at the same time,
    establishing the RSNA using the first wireless device and discontinue establishing the RSNA using the second wireless device in response to the first MAC address of being lower than the second MAC address; or
    establishing the RSNA using the second wireless device and discontinue establishing the RSNA using the first wireless device in response to the second MAC address being lower than the first MAC address.

13. The method of claim 10, further comprising establishing the RSNA using a common master key, wherein the common master key is (i) a pre-shared key input into the first wireless device and the second wireless device or (ii) assigned by a PBSS authenticator, and wherein the PBSS authenticator includes the PBSS control point (PCP), a station or a group of stations of the PBSS authorized as the PBSS authenticator, or a station of the PBSS configured to install the common master key.

14. The method of claim 10, further comprising:
    determining whether a same master key is installed in the first wireless device and the second wireless device; and
    establishing the RSNA by (i) skipping mutual authentication and (ii) conducting a 4-way handshake in response to determining that the same master key is installed in the first wireless device and the second wireless device.

15. The method of claim 10, further comprising including a key identifier in an advertisement message of at least one of the first wireless device and the second wireless device, wherein the key identifier (i) indicates that a common master key is installed in the respective wireless device and (ii) is generated based on the common master key and a network identifier of the PBSS.

16. The method of claim 10, further comprising:
    determine, based on an advertisement message received by the first wireless device from the second wireless device, whether a common master key is installed in the first wireless device and the second wireless device; and
    in response to determining that the common master is installed in the first wireless device and the second wireless device, establishing the RSNA by (i) skipping mutual authentication and (ii) conducting a 4-way handshake with the second wireless device.

17. The method of claim 10, further comprising:
    exchanging messages other than a 4-way handshake between the first wireless device and the second wireless device; and
    based on the messages, performing the following at the same time: (i) exchange security capabilities of each other, (ii) associate with each other, and (iii) establish the RSNA.

18. The method of claim 17, further comprising tunneling at least one of the messages through the PBSS control point (PCP).

* * * * *